United States Patent [19]

Rorden et al.

[11] Patent Number: 4,994,963
[45] Date of Patent: Feb. 19, 1991

[54] SYSTEM AND METHOD FOR SHARING RESOURCES OF A HOST COMPUTER AMONG A PLURALITY OF REMOTE COMPUTERS

[75] Inventors: Randall J. Rorden, Orem; Ronald B. Arthur, Provo; Michael E. Rex, Orem; Darryl J. Stewart, Provo; Mark Muhlestein, Orem; Dennis A. Fairclough, Orem, all of Utah

[73] Assignee: Icon Systems International, Inc., Orem, Utah

[21] Appl. No.: 266,381

[22] Filed: Nov. 1, 1988

[51] Int. Cl.$^5$ .............................. G06F 15/16
[52] U.S. Cl. ..................... 364/200; 364/228.3; 364/228.1; 364/248.1; 364/236.2; 364/235; 364/252; 364/239; 364/239.4
[58] Field of Search ......................... 364/200

[56] References Cited

U.S. PATENT DOCUMENTS 3,976,979  8/1976  Parkinson et al. .................. 364/200

Primary Examiner—Raulfe B. Zache
Attorney, Agent, or Firm—Workman, Nydegger & Jensen

[57] ABSTRACT

A system for providing a high speed digital communication path between the processor of a host computer and the processors of one or more remote computers. The high speed digital communication path allows a remote computer to efficiently share the resources of the larger host computer such as high speed magnetic disk drives and printers. A host interface located at the host computer is connected to the internal host bus of the host computer. The host interface includes a host port and components which provide for the transfer of data from the host bus to the host port. The data bits presented at the host port are arranged in a parallel format. A communication cable conveys the parallel data bits from the host port to a remote port in a remote interface at a remote computer. The remote interface provides a random access memory and components for transferring data from the remote bus to the random access memory and vice-versa. Data bits presented at the remote port are also conveyed to the random access memory. The host interface and the remote interface include control structures to supervise and arbitrate accesses to the communication cable and to the random access memory.

43 Claims, 13 Drawing Sheets

SYSTEM AND METHOD FOR SHARING RESOURCES OF A HOST COMPUTER AMONG A PLURALITY OF REMOTE COMPUTERS

BACKGROUND

1. The Field of the Invention

This invention relates to systems and methods for transferring digital data within computer systems. More particularly, the present invention pertains to a high speed communication path that allows one or more remote computers to share the resources of a high speed host computer, thereby increasing the speed of operation of the remote computers.

2. The Background Art

Modern digital computers have become essential to business, science, industry, and military operations throughout the industrial world. In particular, the widespread availability of microcomputers, also often referred to as "personal computers", has made digital computers accessible to more people than ever before.

The affordability and widespread use of the microcomputer has caused a myriad of different microcomputer application programs to become available directed to those tasks that the microcomputer is best adapted. Many such applications, however, require the additional power of a mini or mainframe computer system unavailable in a microcomputer. Thus, many facilities are equipped with both a powerful mainframe or minicomputer, as well as a plurality of remote microcomputers located on the site.

Disadvantageously, the operating systems, architectures, and standards that have been developed for the microcomputer have differed from those developed for larger computer systems In view of the desire to retain efficient operations, these differences have made the interfacing of the different types of computers quite difficult.

Moreover, the internal and peripheral devices used with larger computers are often faster than the corresponding devices associated with each of the microcomputers. For example, while it is not generally economical to provide each microcomputer with a high capacity, fast-access magnetic hard disk drive memory device, it is effective to provide such a magnetic hard disk drive in connection with a mini or mainframe computer. Also, it is common for a high speed, high quality printer to be associated with a mini or mainframe computer, while not with a microcomputer.

Large computer systems often have excess space on their disk drive memory. Also, the printers associated with larger computers often sit idle much of the time. For these reasons, and because it is generally desirable to allow remote microcomputers to communicate with larger host computers, there has been a yet unfulfilled need for an effective communication link between a plurality of remote microcomputers and a larger host computer, whereby the remote computers could utilize directly the resources of the host computer.

Unfortunately, previously available computer systems do not provide for communication between a remote and a host computer in a manner that permits the remote computer to efficiently use the resources of the host computer. For example, data transmission systems such as local area networks and terminal communication systems, utilize serial data communication techniques that transmit data bits between computers one at a time over cables. This severely limits the speed of communication making impractical the transmission of data on a "clock cycle" basis, which is necessary for memory accesses by a microprocessor. The arbitration and managing functions exercised by local area networks slow communications even further. Thus, it has long been a need in the art that a remote computer and a host computer be able to communicate fast enough to share resources efficiently.

In view of the foregoing, it would be advantageous to develop a system and method for allowing a remote computer to share the resources of a host computer by providing high speed communication between the two. It would be a further advance if such a system were to allow a remote computer to access the disk drive of a host computer as a virtual disk drive. It would further benefit the users of smaller computers to provide a communication system for allowing a plurality of remote computers to off-load printing tasks to a host computer and to allow a remote computer to organize files into virtual disk partitions in a host computer disk drive. A data communication system for allowing one or more networks of remote computers to share the resources of a host computer, such as sharing of printers and file transfer functions, would be even a further step forward.

OBJECTS AND BRIEF SUMMARY OF THE INVENTION

In view of the foregoing, it is a primary object of the present invention to allow one or more remote computers to share and access the resources of a host computer. Such resources could include, for example, a plurality of operating systems available on the host computer.

Yet another object of the present invention is to increase the overall throughput of one or more remote computers.

An additional object of the present invention involves allowing one or more remote computers to share a peripheral device, such as a printer, that is associated with a host computer.

It is a further object of the present invention to decrease disk access times for a plurality of remote computers.

The present invention also has an objective of providing a high-speed communication path between a host computer and a remote computer.

It is yet another object of the present invention to enable one or more networks of remote computers to share the resources of a single host computer.

Still another object of the present invention is to allow one or more remote computers to act independently of a host computer, or to act as virtual terminals for the host computer.

These and other objects of the present invention will be further appreciated by an examination of this disclosure and by practicing the invention.

The present invention provides a high-speed digital communication path between a host computer and at least one remote computer by establishing a communication path directly between the internal bus of a host computer and the internal bus of a remote computer. The system of the present invention may be described as an interprocessor communication system, since the communication link established is essentially between the central processor of a host computer and the central processor of a remote computer.

In the embodiment of the present invention disclosed herein a host interface is installed in the host computer and a remote interface is installed in each remote computer of the system. The host interface allows digital data and control signals on the bus of the host computer to be transferred between that host bus to one of several host ports located at the host interface. Similarly, the remote interface allows digital data and control signals to be transferred between the bus of each remote computer and a corresponding remote port located on the remote interface at that remote computer.

A cable interconnects one of the host ports to each remote port. The interconnecting cable includes a sufficient number of conductors as to convey control signals and transmit data in a parallel mode on individual pairs of conductors. The bus of the remote computer is effectively rendered an extension of the host bus through the host interface, the interconnecting cable, and the remote interface.

A multiplexing means is provided in the host interface to sequentially multiplex either an address or digital data that is to be presented at the host port and thereafter, by way of the interconnecting cable, to the remote port. Control means in the form of control circuits are provided on both the remote interface and the host interface.

An address select/decode circuit in conjunction with the control means of the host interface causes one of several host ports to be selected from an address presented on the bus of the host computer. Thus, the most significant bits of an address presented on the bus of the host computer serves to select which host port is to be accessed. The remaining bits of an address presented on the bus of the host computer are used to select a location in a memory means or random access memory, which in the preferred embodiments is located on the remote interface. In this manner, the host computer is able to address the remote computer as if it were any other logical device in association with the host computer.

In the preferred embodiment of the invention disclosed herein, the host control circuit also regulates the operation of a byte-swapping means, or byte-swapping data buffer, which corrects the ordering of data bytes to overcome differences between the byte ordering schemes of the remote and host computers.

As disclosed herein, the remote computer is an IBM model PC/AT, an IBM model PC/XT computer, or an equivalent. A remote interface is provided at each remote computer which includes one remote port that is connected to the interconnecting cable. The remote interface includes a random access memory which functions as a temporary storage location for digital data received from the host computer. Digital data destined to the host computer from the remote computer is also stored temporarily in the random access memory. Such digital data is transmitted to the host computer by way of the remote port, the interconnecting cable, and the host interface. A control circuit included in the remote interface regulates the transfer of digital data between the random access memory and the remote port and bus of the remote computer.

When digital data is being both received by and transmitted from the remote computer, accesses to the random access memory by the host and remote computers is interleaved. The structure and speed of operation of the interfaces produce virtually no delay in the system. The operation of both the host interface and the remote interface is thus transparent, not only to a user, but to the remote and host computers.

The structure of the remote interface, the host interface, and the cable interconnecting the two enables the remote computer to efficiently share the resources of the host computer and to carry out functions which it otherwise could not. With the present invention supplemented by suitable software, a remote computer can access the memory devices of a host computer and also share the use of peripheral devices, such as printers. Moreover, the present invention allows for efficient file transfers between different operating systems and establishes the remote computer as a very fast terminal for the host computer.

BRIEF DESCRIPTION OF THE DRAWINGS

In the description which follows, and in the accompanying drawings, some of the figures have been divided into two or more parts in order to increase their clarity. Where a figure has been divided into two or more parts, a number designation has been added as a suffix to the figure number for each part into which the figure has been divided. For example, in the detailed schematic diagram provided in FIG. 5, the figure has been divided into two parts designated as "FIG. 5-1" and "FIG. 5-2." In the case of figures which have been divided into two or more parts, the complete figure may be reassembled by placing the first part of the figure in an upper left position, the second part in an upper right position, and the third part in a lower right position. Boxed letters at the margins of a figure that has been divided into parts indicate electrical interconnections between the parts of that figure.

FIGS. 5-1 and 5-2 provide a detailed schematic diagram of the control circuit of the host interface represented in FIG. 4.

FIGS. 9-1, 9-2, and 9-3 provide a detailed schematic diagram of the control circuit of the remote interface represented in FIG. 8.

DETAILED DESCRIPTION OF THE PREFERRED EMBODIMENT

Figure 1:
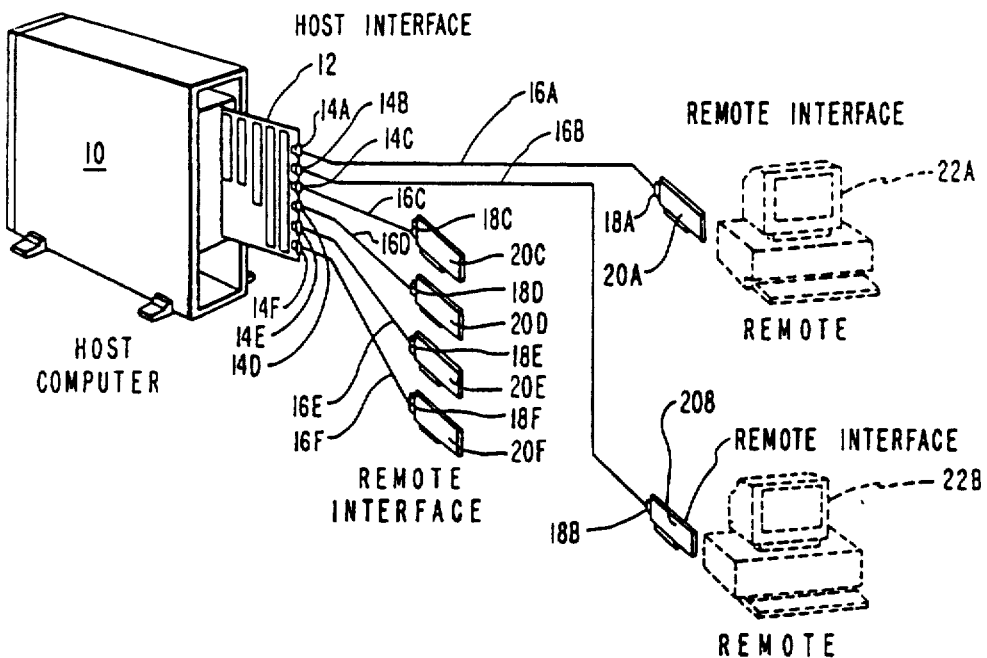
FIG. 1 is a schematic representation of one arrangement of a host computer and a plurality of remote computers interconnected by a preferred embodiment of the system of the present invention.

In the following description, like structures will be identified by like reference characters. It is to be understood that the structures described herein merely represent a presently preferred embodiment of the invention. Thus, the present invention may be implemented in many ways and incorporated into many computer systems, other than those described herein.

General Overview

As indicated earlier, the need has long existed in the computer industry that one or more remote computer systems be able to share the resources of a host computer, such as magnetic disk drives and printers. High-speed, high-quality magnetic disk drives and printers are mechanical devices that are particularly expensive to acquire and maintain. Thus, it is important that a computer system make maximum use of these devices. Allowing a plurality of remote computers to share these resources is much more cost effective than providing each remote computer with its own magnetic disk drive and printer of the same capacity as that provided to the host computer.

The sharing of resources, such as disk drives and printers, between a host and remote computer requires, however, that a very fast communication path be established between the two. The present invention provides such a high-speed communication path in the form of an interface provided at both the host computer and each of the remote computers for enabling a high-speed, processor-to-processor communication path. This allows many other functions to be carried out which would otherwise not be possible.

FIG. 1 illustrates one possible application of the present invention. A host computer 10 is shown as being provided with a host interface 12 that is preferably fabricated on a single circuit board that is selectively insertable and removable from host computer 10.

In the illustrated embodiment, host interface 12 is provided with six (6) host ports 14A-14F. In the application represented in FIG. 1, each of host ports 14A-14F is connected individually by a corresponding one of interconnecting cables 16A-16F to individual remote interfaces 20A-20F, respectively. Each of remote interfaces 20A-20F is preferably fabricated on a distinct circuit board to allow for its easy installation into host computer 10. Remote interfaces 20C-20F are designed to be readily installed in a number of different remote computers, two of which are shown in FIG. 1 by way of illustration as remote computers 22A and 22B.

In the presently preferred embodiment of the invention, remote computers 22A and 22B are IBM model PC/AT or model PC/XT computers, their equivalent, or another work station which incorporates the expansion bus of the IBM model PC/AT or model PC/XT computers. While the embodiment described herein is particularly adapted for use with such remote computers, the present invention may be implemented in many different forms and used with many different host and remote computer systems.

The embodiment of the present invention represented in FIG. 1 affords many advantageous capabilities to a user and many different benefits. Among these are (1) a virtual disk function, (2) a virtual terminal function, (3) a file transfer function, and (4) a print spooling function. Each will be explained below.

Each remote computer 22A-22B is given access to the disk drive of the host computer 10. This is the virtual disk function carried out by the system of the present invention. Using appropriate software, the system shown in FIG. 1 makes it appear to the processor of remote computers 22A-22B that the disk drive of host computer 10 is internal to each respective remote computer 22A-22B. Thus, the system of the present invention is transparent to the central processing units of the host computer 10 and to remote computers 22A-22B.

In the embodiment of the inventive system shown in FIG. 1, remote computers 22A-22B utilize the MS-DOS operating system. In such an operating system each virtual disk drive of host computer 10 simply appears to remote computers 22A-22B as a different internal designated disk drive, such as drive C, drive D, and so forth. The virtual disk drive function provided by the present invention may be organized and partitioned as any other MS-DOS disk drive for easy access and information sharing.

The host disk drive can be a very large, fast and efficient device. For example, a host disk drive may use a disk cache scheme. In such a disk cache scheme. often accessed data is moved from disk into a dedicated random access memory where it can be accessed in much less time than if a disk access were required. Furthermore, multiple disk drives may be included in the host computer.

The communication path between the remote computers and the host computer is also fast. Therefore, the use of the virtual disk drive function allows a remote computer to effect disk drive accesses faster than might otherwise be possible using a disk drive internal to the remote computer. This results in responsive remote computer operation.

The virtual terminal function of the inventive system allows the remote computers 22A-22B to be connected to the central processing unit of host computer 10 and act as terminals thereof. The extremely fast communication path between host computer 10 and remote computers 22A-22B provides screen updates that are effectively instantaneous.

A file transfer function may also be efficiently carried out using the present invention. The file transfer function allows a user to easily move files between different operating system environments. For example, in the presently preferred embodiment, file transfers may be effected between the UNIX, PICK, and MS-DOS operating system environments.

With the high-speed communication pathway provided by the present invention between each remote computer 22A-22B and host computer 10, the sharing of a printer or "print spooling" may also be accomplished. This feature permits the sharing of expensive printing devices, such as laser printers. The spooling for each printer occurs on a first-come, first-served basis, and the data to be printed is stored in the file system of the host computer. The remote computers may thus continue processing without waiting for printing to be completed.

Figure 2:
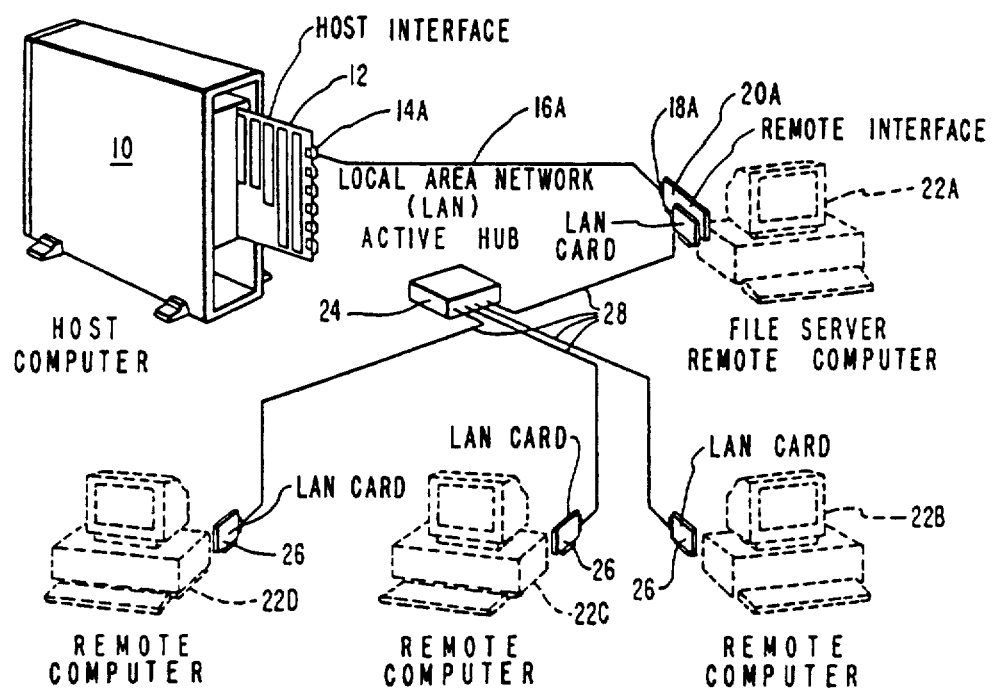
FIG. 2 is a schematic representation of one arrangement of a host computer and a local area network including a plurality of remote computers, one of which is interconnected to the host computer by the system of the present invention shown in FIG. 1.

FIG. 2 illustrates the embodiment of the present invention shown in FIG. 1 adapted to allow a local area network (LAN) of remote computers to function more efficiently by affording to a network file server remote computer 22A access to the fast disk drive of host computer 10. Remote computers 22B, 22C, and 22D are the other computers in the network. Each remote computer 22A-22D is provided with a LAN card 26 which is connected to an active hub 24 by a plurality of LAN cables 28. One local area network preferably adapted for use with the present invention is available from Novell, Inc. of Provo, Utah as the NETWARE ® 286 2.0a system.

In the data communication system illustrated in FIG. 2, file server remote computer 22A may be based on an Intel 80386 microprocessor. By utilizing the host disk drive according to the system of the present invention, file server remote computer 22A realizes up to a threefold increase in throughput. In addition, delays which are often experienced in file transfers and data base applications are reduced. Furthermore, the present invention improves the performance of some application programs by an order of magnitude.

In FIG. 2, file server remote computer 22A is provided with a direct connection to the resources of host computer 10 through interconnecting cable 16A. A file on the host disk drive thus takes the place of the disk drive that would normally need to be resident on file server remote computer 22A. As files on the large host disk drive can be accessed at very high speed, the present invention allows the local area network to operate more efficiently.

Figure 3:
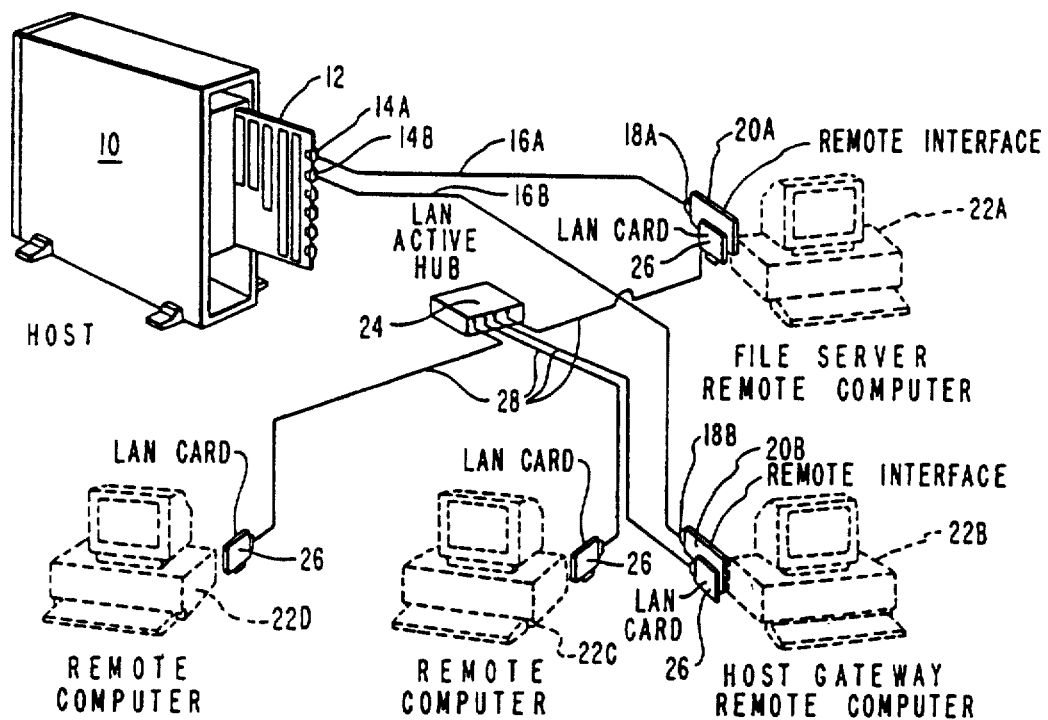
FIG. 3 is a schematic representation of one arrangement of a host computer and a local area network including a plurality of remote computers, two of which are interconnected to the host computer by the system of the present invention shown in FIG. 1.

FIG. 3 shows yet another arrangement of the present invention used in an alternate manner with the local area network already described. File server remote computer 22A continues to be connected to host computer 10 by way of interconnecting cable 16A. Another of the remote computers, a host gateway remote computer 22A, is also provided with a direct connection to the host computer through remote interface 20B and interconnecting cable 16B. With one remote computer serving as a file server remote computer to share the disk drive of the host computer, host gateway remote computer 22B functions as a gateway to allow all other remote computers 22C-22D connected to the local area network to have access to the resources of the host computer and exercise the advantageous functions mentioned earlier.

A number of remote computers can be added to a local area network, such as that provided by Novell, Inc. This not only allows a number of remote computers to have access to all other remote computers on the local area network, but by way of host gateway remote computer 22B, to also have access to the resources of host computer 10. Due to the speed at which data is transferred between host gateway remote computer 22B and host computer 10, the only delay experienced by the user of a remote computer on the local area network is due to the delay inherent in the local area network itself.

All of the above are possible because the present invention establishes a high-speed communication path between the host and the remote computers. While the inventive embodiment disclosed incorporates some network-like functions, it is not a substitute for a local area network, such as that represented in FIGS. 2 and 3. Rather, the presently preferred embodiment augments and enhances the functions of a local area network.

A specific structure of a presently preferred embodiment of the present invention will now be described as adapted for use with host computers available from Icon International, Inc. of Orem, Utah utilizing the Motorola MC 68020 microprocessor.

Host computers incorporating the MC 68020 microprocessor must include a host bus structure meeting minimum structural and operational requirements. Complete information concerning the MC 68020 microprocessor can be found in the publication entitled *MC 68020 32-bit Microprocessor User's Manual*, 2d. Ed. (1985), and later editions, which are available from Prentice Hall Publishers, which are incorporated herein by reference.

Particular information concerning the bus structure of the host computer systems available from Icon International, Inc. is available from documentation pertaining to each specific computer system and in United States patent application Ser. No. 074,310, which is incorporated herein by reference.

As will be explained shortly, extremely fast data transmission between a host computer and one or more remote computers is possible according to the teachings of the present invention by creating a parallel data transmission path from the host bus in the host computer to the remote bus in the remote computer. The use of the structures herein described to form this "bus-to-bus" communication pathway allows extremely fast data transfer between a host computer and one or more remote computers without the time-consuming bottlenecks often found in local area networks, bottlenecks resulting from time-intensive tasks such as packetization and network arbitration.

The Host Interface

Figure 4:
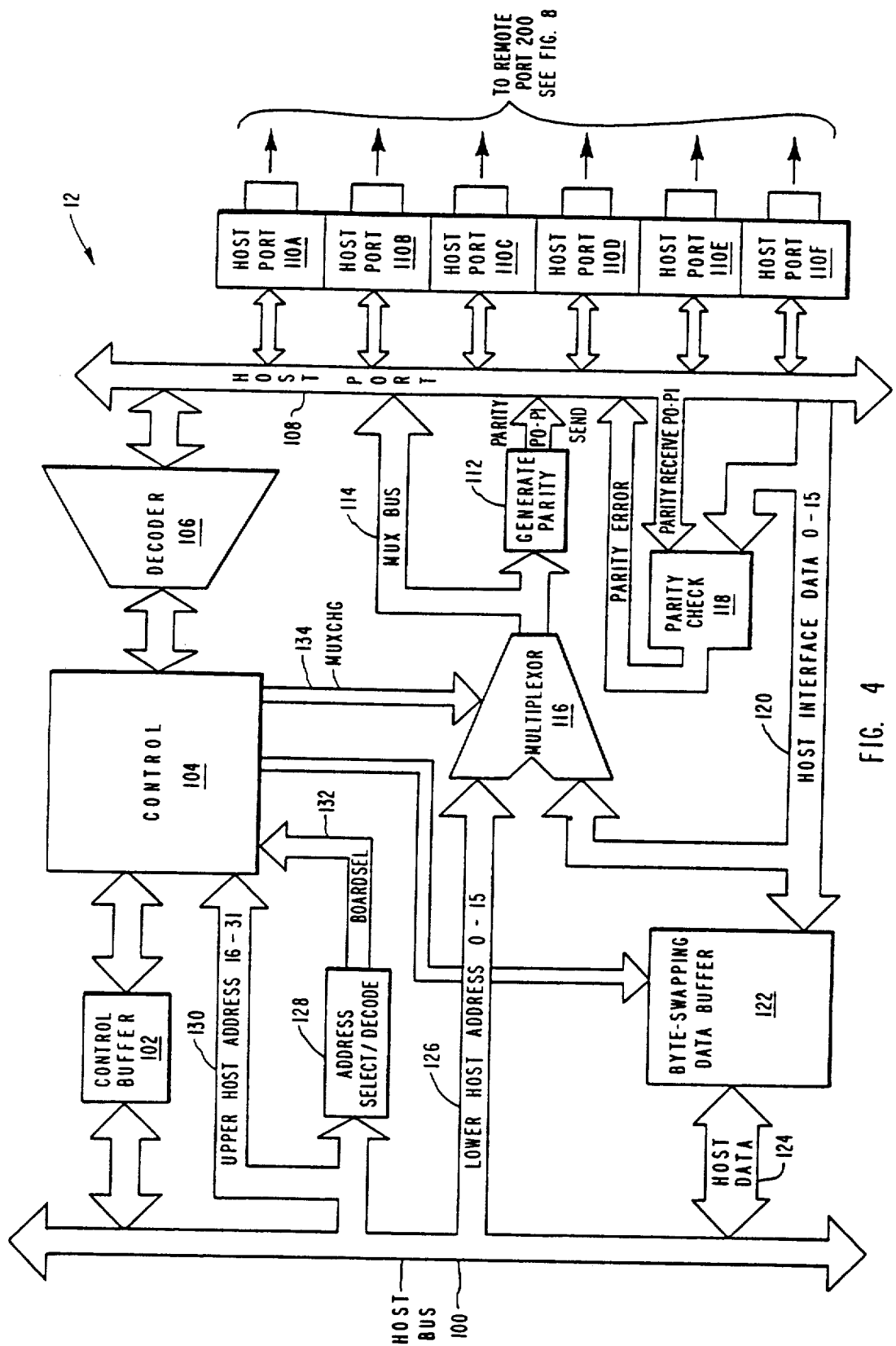
FIG. 4 is a block diagram representing the structure of the host interface of the system of the present invention shown in FIG. 1.

FIG. 4 is a block diagram showing the structures of one embodiment of host interface 12 incorporating teachings of the present invention. Consistent with FIGS. 1-3, it is preferred that host interface 12 be placed on a single circuit board, and that six (6) host ports 110A-110F be provided on each board. Other numbers of host ports, as well as other configurations for the host interface, are considered to be within the scope of the present invention.

A host bus 100, including thirty-two (32) lines serving as address lines, thirty-two (32) lines serving as data lines, and other control lines, is the principle bus of host computer 10. The MC 68020 microprocessor is connected to host bus 100, and when access to a remote device is desired, the address of that device is first presented on host bus 100 followed by the presentation thereon of digital data from or destined to the addressed device. With a host computer 10 utilizing a MC 68020 microprocessor, the host bus structure is dictated by the requirements of the MC 68020 microprocessor.

Host interface 12 receives all thirty-two (32) of the address lines and sixteen (16) of the data lines contained on host bus 100. A control circuit 104 in host interface 12 receives bits 16-31 of the address by way of an upper address bus 130. The remaining address bits 0-15 are presented to a multiplexer 116 by way of a lower host address bus 126. As will be explained in greater detail shortly, bits 16-31 on upper host address bus 130 select one host port 110A-110F, while bits 0-15 on lower host address bus 126 are passed directly by way of multiplexer 116 to the selected host port 110A-110F for selecting one address of a location in the random access memory location provided on the remote interface.

For maximum efficient and versatile operation, each host port 110A-110D provided in host interface 12 is addressed as a logical device, just as any memory space is addressed in the logical memory space of host computer 10.

In the inventive embodiment using the host computers previously identified, address space has been reserved for host interface 12 beginning at hexadecimal address E0000000 and extending through hexadecimal address E0FFFFFF. Each host port 110A-110F is allocated 128K of logical memory space. With the previously indicated address space being reserved, in host interface 12 there may be a maximum of 128 host ports on the embodiment disclosed.

Provided below in Table A is the summary of potential address allocations for a representative number of the host ports.

TABLE A

| HOST PORT 0 | E0000000 | TO E001FFFF |
|---|---|---|
| HOST PORT 1 | E0020000 | TO E003FFFF |
| HOST PORT 2 | E0040000 | TO E005FFFF |
| . | . | . |
| . | . | . |
| . | . | . |
| HOST PORT 127 | E0FE0000 | TO E0FFFFFF |

The addressing scheme suggested in Table A allows communication between the host computer and the host interface to occur at the port level. That is, there are no special address spaces associated with the functions between the host computer and the various host interface circuit boards. This addressing scheme provides for efficiency and versatility in the inventive embodiments disclosed.

A control circuit 104 in host interface 12 receives any AS, DS, RESET, WRITE, SIZE0, and SIZE1 control signals present on host bus 100. Host interface 12 also outputs several control signals onto the host bus 100. These include INT1, INT2, INT3, INT4, INT5, INT6, INT7, SELACK, DSACK0, and DSACK1, the functions of which will be explained shortly or may be familiar to those having a knowledge of the MC 68020 microprocessor.

A control buffer 102 between control circuit 104 and host bus 100 receives from host bus 100 the AS, DS, RESET, and WRITE control signals. These are then input to control circuit 104. The SIZE0 and SIZE1 control signals on host bus 100 are input directly to the internal components of the control circuit 104 on upper host address bus 130.

Provided below in Glossary A is a summary of the signals represented in FIG. 5 and in some instances discussed in connection with FIG. 4.

GLOSSARY A

| Singal | Function |
|---|---|
| | INPUTS |
| SACK | Select Acknowledge - Initiates the conclusion cycle of each access. This is the multiplexed combination of the ACK signals and in particular the ACK signal from the active port. |
| BOARDSEL | Board Select - Asserted when the address on the host bus compares with the address on the host interface board. When BOARDSEL is asserted it clocks a flip-flop which initiates the enable signal down the delay line. |
| RESET | Reset device - Defines initial state of the control circuitry by clearing the flip-flop. |
| WRITEL | Write Low (low asserted) - Identifies write cycles in order to be able to determine the direction of the data buffers. |
| SELONLIN | Select Online - Indicates the state of the ONLN signal of the active port. Derived from the ONLN signal of the selected port. |
| INTDS | Internal Data Strobe - The buffered DS signal from the host bus. Indicates valid data on a write cycle. Determines when the data should be driven onto the host bus by the host interface. |
| GLOBAL ADRSBUS A0 | Host Address Bus A0 - Helps determine which bytes are being accessed. |
| SIZE0 | From the MC 68020 by way of the host bus - Provides byte/word information. |
| SIZE1 | From the MC 68020 by way of the host bus - Provides byte/word information. |
| LA16 | Latched Address A16 - Latched address along with A17, A18, A19 for use after the actual signal has been removed from the host bus. Determines whether to use the swapped or unswapped data buffers. The A16 bit is used to determine if it is in the upper or lower 64K of the 128K of logical address space allocated to the host port. |
| | OUTPUTS |
| DSEN | Data Strobe Enable - Derived for the host interface to be a pseudo data strobe it is driven to the selected port. Indicates that the data on the data bus is valid. |
| ASEN | Address Strobe Enable - This is the principal signal which generates the Address Strobe that is driven to the selected host port. Indicates that the address on the host address bus is valid. |
| ENSTBS | Enable Strobes - This signal allows the AS, UDS, and LDS signals to be disabled as soon as the SACK (ACK) signal is returned, without waiting for the delay through the delay line. This turns off these control signals from the remote computer and begins to terminate their current cycle as soon as possible. |
| MUXCHG | Multiplexer Change - Causes the multiplexer to switch from the address input to the data input. Since the address and data are multiplexed this signal tells when the address has had sufficient time to be latched and the bus can now be converted to data. |
| ADDEN | Address Enable - Enables the address through the drivers of the selected port. |
| PARCLK | Parity Clock - Signals when it is valid to check parity and report any errors encountered |
| DSACKEN | Dsack Enable - Gates the DSACK0 and DSACK1 signals onto the host bus. DSACK0 and DSACK1 are hardwired since the host interface board is always a 16-bit device. DSACKEN gates the appropriate response to inform the processor of the status of this board. |
| ENUDS | Enable Upper Data Strobe - This signal is asserted when the address has been decoded and the upper byte is being accessed. This signal is driven to the selected port. |
| ENLDS | Enable Lower Data Strobe - The address has been decoded and the lower byte is being accessed. This signal is driven to the selected port. |
| GBDEN | Global Bus Data Enable - Enables the unswapped data buffers between the host bus and the host interface data bus (Lower 64K). |
| SGBDEN | Swapped Global Bus Data Enable - Enables the swapped data buffers between the host bus and the host interface data bus (Upper 64K). |
| SREGDATA | Stored Register Data - Enables the stored register data in the Byte-Swapping Data Buffer onto the host data bus. |
| ADSTLATCH | Address Status Latch - Latches A16, A17, A18, A19 and STATSEL for distributed use in the host interface. |

When a remote computer desires to access the host computer, an interrupt signal generated by the remote computer will appear at one of host ports 110A-110F.

Also included on host interface 12 is a parity generator circuit 112 and a parity check circuit 118. Parity is generated for the transmission of addresses and data and checked on the reception of data. Parity check circuit 118 and parity generator circuit 112 may be readily devised by those having skill in the art. Parity is generated and checked for both address signals and digital data transmitted between the host and remote computers. The two parity bits P0 and P1 are included on the host port bus 108.

When digital data is received at any one of host ports 110A-110F, the parity is checked. An interrupt signal is generated, if an error is detected, and the parity error bit signal is enabled onto the host port bus. The parity interrupt signal sets a bit in the status register (to be described shortly) which then causes an interrupt signal on host bus 100, alerting the processor of host computer 10 that a parity error has occurred in the reception of data. The processor of host computer 10 can then take corrective action.

If a parity error is detected by parity check circuit 118, a parity interrupt signal will be generated. All interrupt signals from each of host ports 110A-110F and any parity interrupt signals are combined to form a consolidated interrupt signal by control circuit 104 and its associated components. Preferably, this consolidated interrupt signal can be jumpered to any of interrupt levels 1-7 allowed by the MC 68020 microprocessor.

An interrupt signal generated by a remote computer is conveyed to the MC 68020 microprocessor by way of remote interface 20, interconnecting cable 16, and host interface 12. This causes a consolidated interrupt signal directed to the MC 68020 microprocessor on the host bus 100. When a consolidated interrupt signal occurs on the host bus 100, the MC 68020 microprocessor then polls a status register to determine with which host port 110A-110F the interrupt is associated.

An address select/decode circuit 128 generates a BOARDSEL signal (board select). The BOARDSEL signal is generated when there is a match between the address assigned to the host interface and the address presented on the host bus 100. The BOARDSEL signal drives the SELACK signal (select knowledge) back onto host bus 100 to acknowledge to the processor of host computer 10 that a valid access has occurred.

The SELACK signal to the MC 68020 microprocessor is gated onto host bus 100 by the BOARDSEL signal and carried to control circuit 104 by a board select bus 132. The generation of a DSACKEN signal (DSACK enable) enables DSACK0 and DSACK1 control signals onto host bus 100 from control circuit 104 and from there to the microprocessor of host computer 10.

In accordance with one aspect of the present invention, host interface 12 includes a first control means for conveying to host ports 110A-110F digital data placed on the bus of host computer 10. As shown in FIGS. 5-1 and 5-2 the components comprising control circuit 104 of FIG. 4 include four F74 flip-flops, two F04 inverters, three F08 AND logic gates, two F00 NAND logic gates, a 150 nanosecond ten-tap delay DL 150NS-10TAP, and a programmable array logic device (PAL 16L8). Control circuit 104 provides many signals necessary to coordinate the operation of the components of host interface 12.

Figures 1, 5:
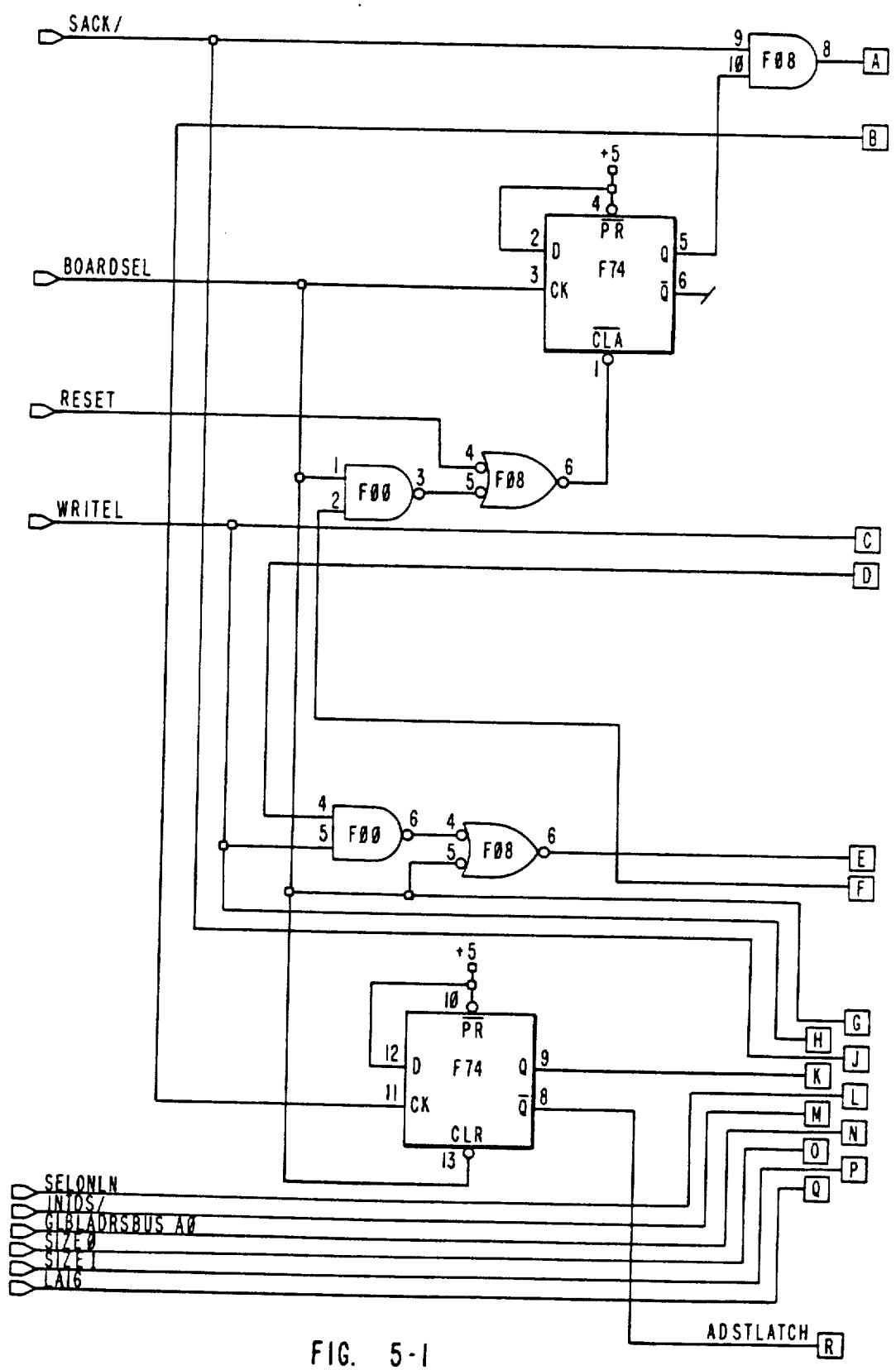
Figures 2, 5:
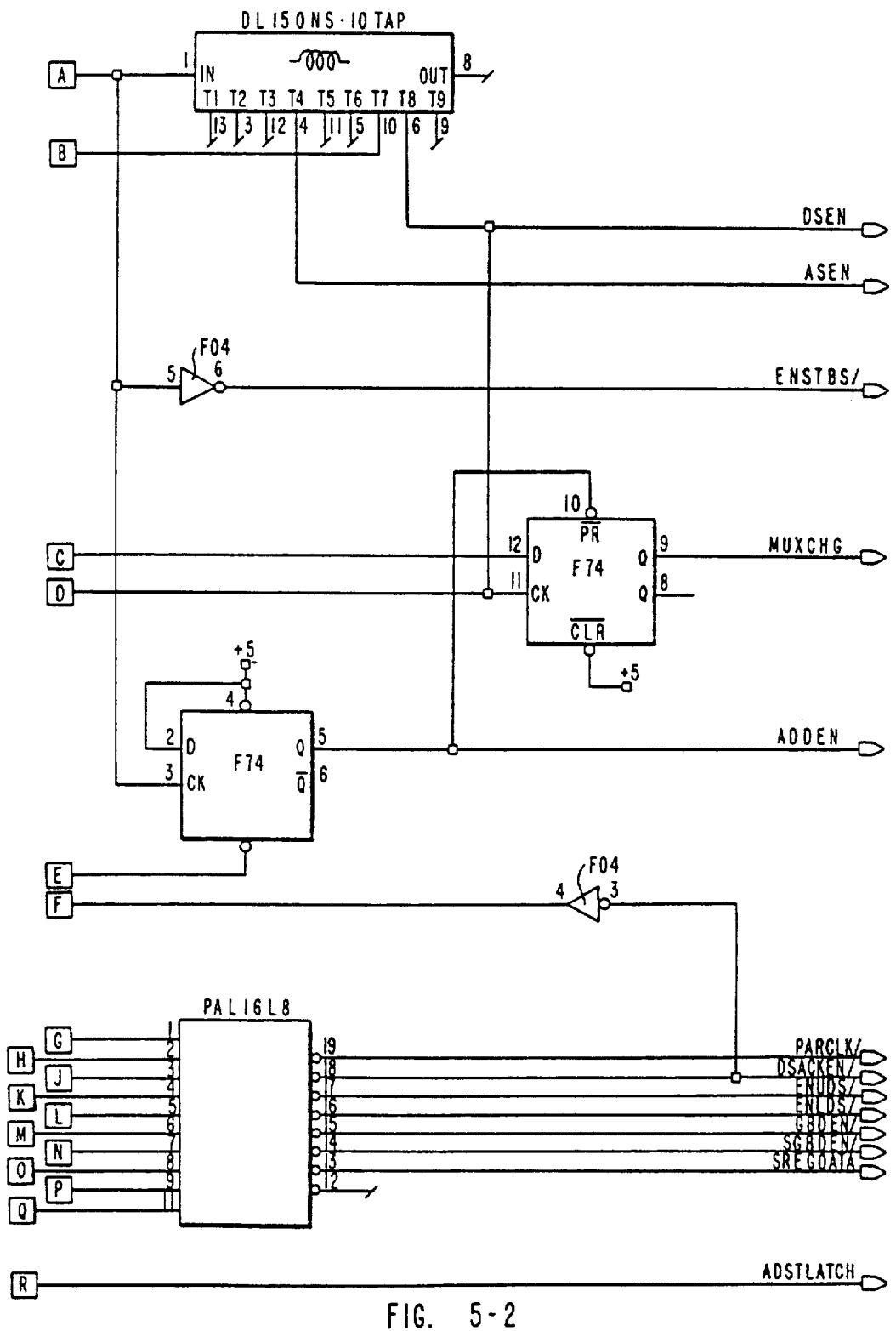

Provided in Appendix A is the PALASM programming code listings for the programmable array logic device (PAL 16L8) represented in FIG. 5.

Also in FIG. 4 is a decoder circuit 106 connected between control circuit 104 and a host port bus 108. The function of decoder circuit 106 is to properly decode and drive several control signals between appropriate host port 110A-110F and control circuit 104. Ten control signals must be driven to the appropriate host port by the decoder circuit 106. These signals are listed below in Glossary B.

| GLOSSARY B | |
|---|---|
| Signal | Source |
| AS | Address Strobe - Derived from INTAS, ENSTBS, and ASEN |
| UDS | Upper Data Strobe - Derived from ENUDS, ENSTBS, and DSEN |
| LDS | Lower Data Strobe - Derived from ENLDS, ENSTBS, and DSEN |
| SENDEN | Send Enable - Derived from ADDEN |
| DATAEN | Data Enable - Derived from (not) WRITE and BOARDSEL |
| UDEN | Upper Data Enable - Derived from (not) WRITE, (not) STATSEL, and BOARDSEL |
| STATRD | Status Read - Derived from STATSEL, (not) WRITE, and BOARDSEL |
| STATWT | Status Write - Derived from WRITE, INTDS, STATSEL, and BOARDSEL |
| SACK | Select Acknowledge - Derived from the selected ACK |
| SELONLN | Select On Line - Derived from the selected ONLN |

Only two signals, ACK (acknowledge) and ONLN (on line), are driven from host ports 110A-110F to control circuit 104 by decoder circuit 106.

A decoder circuit 106 utilizes address lines A17, A18, and A19 from host bus 100 to select the appropriate host port 110A-110F to or from which to drive control signals. It may be appreciated that these three bits of address are more than that required to select one of the six host ports.

These indicated address lines, as well the STATSEL signal, are preferably latched for use in the decode circuit by the ADSLATCH signal. The STATSEL signal is derived from the decode of the multiplexer lines when the address is present. The STATSEL signal is asserted when the address FFF0 is detected on the multiplexer bus.

Also shown in FIG. 4 is a multiplexer 116, which first receives the address bits from the host bus 126 and then receives the digital data which was placed on the host bus 100 buy way of a byte swapping data buffer 122, the function of which will be explained shortly. The address and data bits are multiplexed onto the multiplexer bus 114 (MUX BUS) which is connected to host port bus 108. Whether the address bits or the data bits are output from the multiplexer circuit is determined by the MUXCHG (multiplexer change) signal 134 output from control circuit 104.

Figure 6:
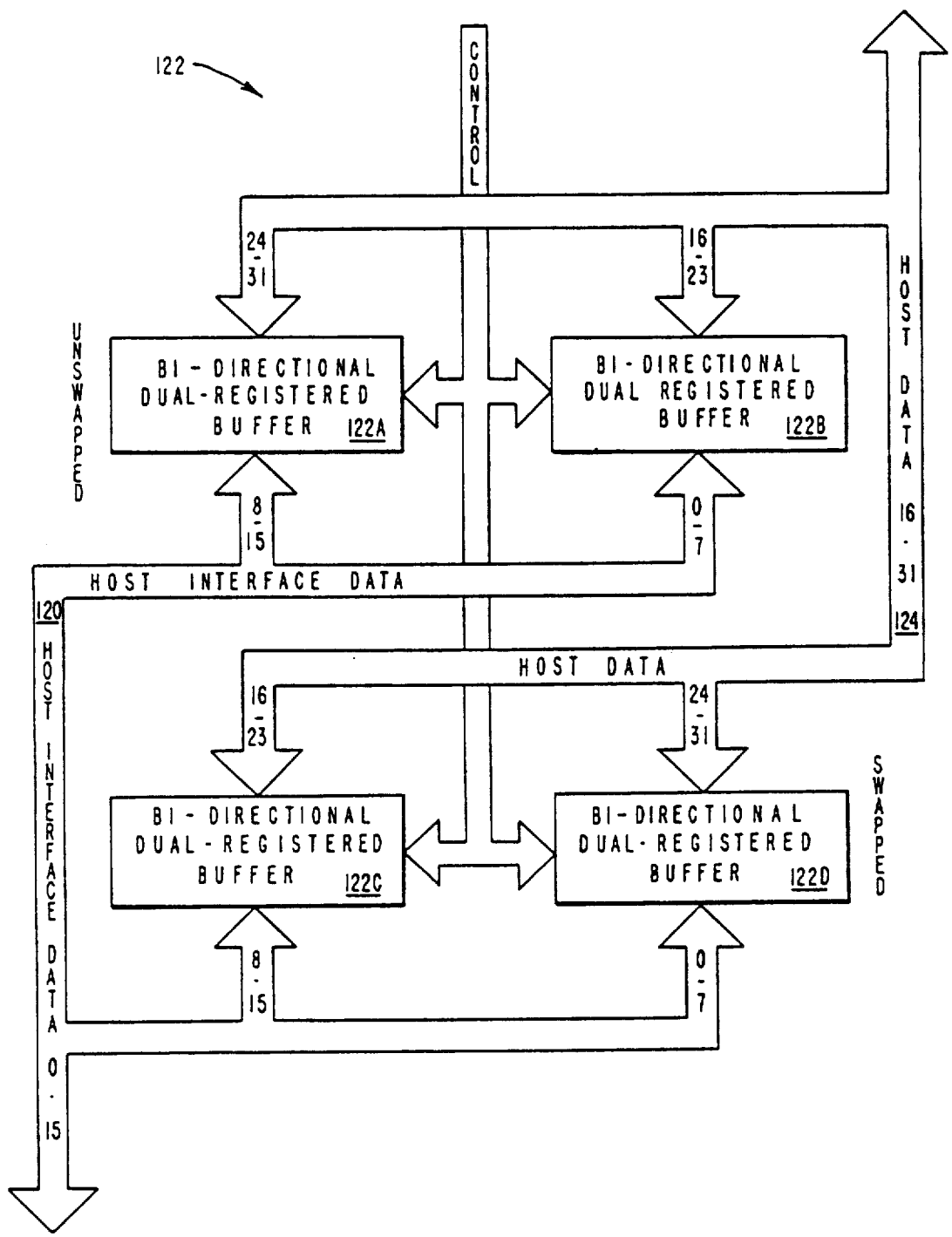
FIG. 6 is a block diagram showing the structure of the byte swapping data buffer of the system of the present invention represented in FIG. 4.

The byte swapping data buffer 122 of FIG. 4 is illustrated in greater detail in FIG. 6. Byte swapping data buffer 122 is required because of inconsistent byte ordering used when different microprocessors address memory. For example, the bus structure dictated by the MC 68020 microprocessor provides that the least significant byte of a 16 bit word in memory is accessed at the higher address of that word. In contrast, Intel microprocessors commonly utilized in remote computers intended for use with the disclosed embodiment of the present invention access the least significant byte of a 16 bit word in memory at the lower address of that word.

As shown in FIG. 6, byte swapping data buffer 122 includes four identical bidirectional dual registered buffers 122A-122D. Under the control of control circuit 104, byte swapping data buffer 122 allows the host interface data bus lines 0-7 to be buffered to host data bus lines 16-23 or 24-31. Likewise, host interface bus data lines 8-15 may be buffered to host data bus lines 16-23 or 24-31.

Since the present invention involves interconnecting the processor of host computer 10 with the processor of one or more remote computers by interfacing the host bus and the remote bus, byte swapping data buffer 122 is a necessity. Implementing byte swapping data buffer 122 in hardware, rather than software provides for much more efficient operation.

Below in Glossary C is a list of the control signals carried on the control lines represented in FIG. 6 and provided by control circuit 104 to byte swapping data buffer 122.

| GLOSSARY C | |
|---|---|
| WRITEL | Provides buffer direction information. |
| SACK | Latch host interface bus data. |
| SREGDATA | Release stored data from host interface data bus to host data bus. |
| GBDEN | Enable unswapped data buffers. |
| SGBDEN | Enable swapped data buffers |

Figure 7:
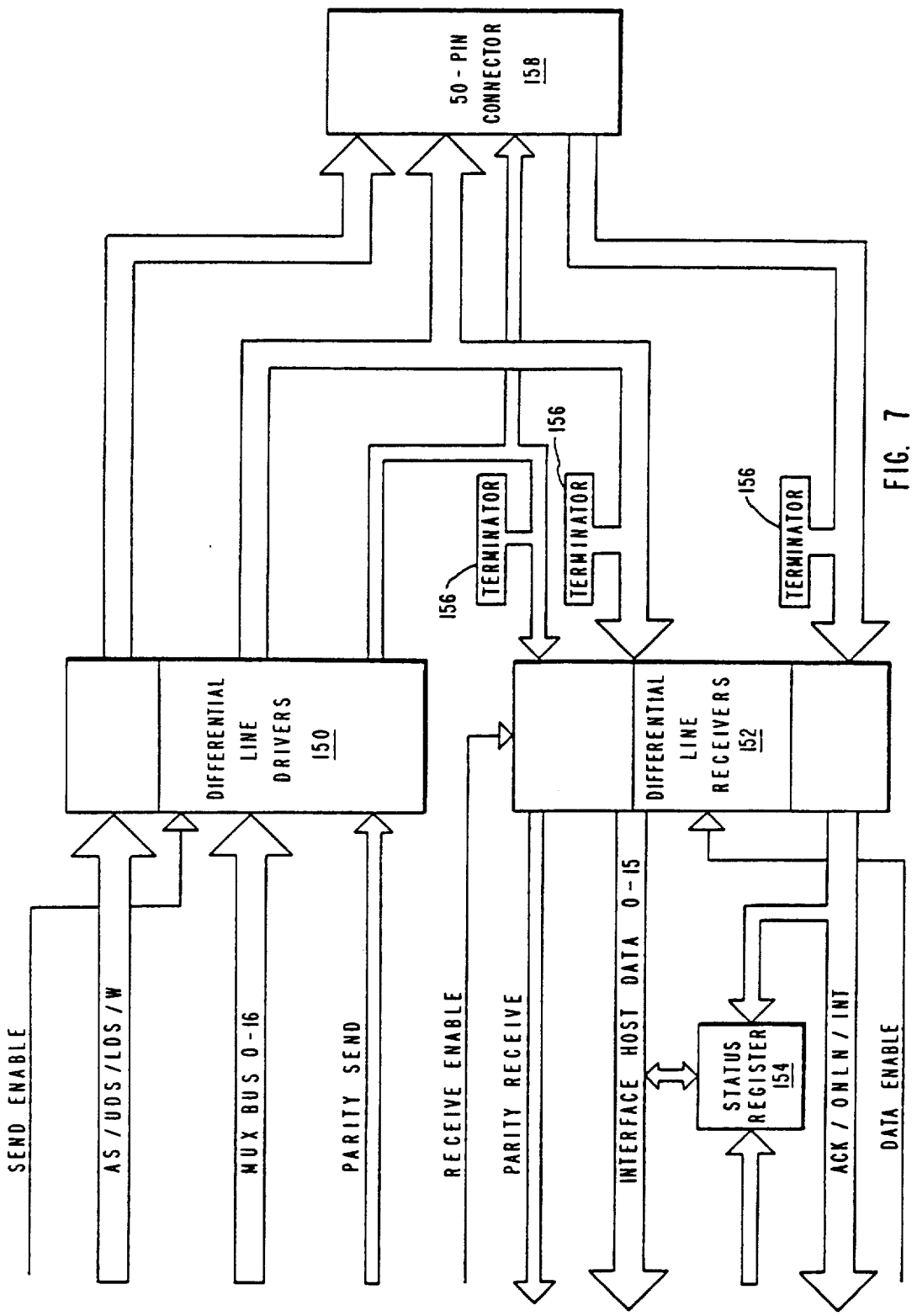
FIG. 7 is a block diagram showing the structure of the host ports of the system of the present invention represented in FIG. 4.

FIG. 7 is a detailed blocked diagram showing the structures of each host port 110A-110F represented in FIG. 4. The principle components of host ports 110A-110F are a plurality of differential line drivers 150 and differential line receivers 152, which should be carefully chosen from those available in the art to provide adequate speed of operation and immunity from noise. Differential drivers and receivers available from Texas Instruments of Dallas, Texas, as Part Nos. MC 3487 and MC 3486, respectively, are preferred for use in the described embodiments.

Each differential line driver 150 and differential line receiver 152 is connected to one pair of conductors in interconnecting cable 16 by way of a 50-pin connector 158. The use of differential line drivers 150 and differential line receivers 152 allows rapid data transfer rates to be utilized, since the voltages presented on each pair of conductors in interconnecting cable 16 must merely reverse polarity for the semiconductor logical devices being used, rather than reaching a predetermined threshold voltage.

As shown in FIG. 7, the AS, UDS, LDS, and WRITE signals are always enabled through differential line drivers 150 to connector 158. The multiplexer bus bytes and the two parity send bits (P0 and P1 in FIG. 4) are enabled by the SENDEN (send enable) signal. As shown in FIG. 4, the two parity send bits and the multiplexer bus bits are common among all of host ports 110A-110F. Thus, it is the assertion of the correct SENDEN signal which causes the multiplexer bus bits and the two parity send bits to be driven onto the appropriate connector 158 and to the appropriate remote computer.

Similarly, a plurality of differential line receivers 152 are represented in FIG. 7 as part of the host port. The ACK (acknowledge), ONLN (on line), and INT (interrupt) control signals are always enabled through differential line receivers 152. The remaining data bits and parity receive bits are enabled through the differential line receivers 152 only in the receive mode. Differential line receivers 152 which drive the interface host data bus are divided into upper and lower bytes. In a normal read cycle they are both enabled. When a status register 154 is accessed, however, the upper byte is disabled and the status bytes are gated onto the upper part of the interface data lines.

Status register 154 represented in FIG. 7 uses the last eight (8) words of both 64K memory allocations which are reserved for special functions related to host ports 110A-110F. These are intended to be accessed as words only and should be so accessed in the first 64K unswapped memory space. When the status is read the parity checking is disabled. For example, in the described embodiment the status registers are accessed at address offset FFF0.

Provided below in Table C is a list of the bits returned by the most significant byte in the status register and the definition of each of the bits.

TABLE C

| BIT | DEFINITION |
|---|---|
| D8 | Interrupt |
| D9 | ONLINE Status |
| D10 | Attention to host status |
| D11 | Interrupt enable |
| D12 | Parity interrupt |

Provided below in Glossary D is a summary of the function of the status bits listed in Table C.

| GLOSSARY D | |
|---|---|
| Interrupt | Will be a 1 when an interrupt is pending on a port. This means that the host has lost the ONLINE signal from a remote computer or that a remote computer is now coming online. The interrupt may be cleared by writing a 0 to bit D8 of this address. The bit is reset to 0 upon system reset. |
| Status | Shows the current status of the signal from the remote computer. |
| Attention to Host Status | Shows the current status of the attention to host interrupt signal from the remote computer. |
| Interrupt Enable | Is reset to 0 upon system reset. It may be set to a 1 to enable the ONLINE, ATTN and PARITY interrupts for the port. |
| Parity Interrupt | Will be a 1 when a transmission receive parity error has occurred. It may be reset from the host by writing a 0 to bit D12. |

Also represented in FIG. 7 are terminators 156 which are provided on the receive end of all conductors. The termination should be between each differential pair of conductors in interconnecting cable 116 and not referenced to +5 volts or to ground. Terminators 156 should be resistive and should match the characteristic impedance of interconnecting cable 116.

The structures represented in FIG. 7 are but one possible arrangement of a means for providing a host data port. Similarly, the structures represented in FIGS 4-6 are but one possible arrangement for carrying out a means for establishing a digital communication path between the host bus and the host data port. The present invention is specifically intended to include other structures which carry out equivalent functions.

The Communication Cable

The communication cable interconnecting the host port to the remote port is a 50-conductor, 25 twisted pair, 30 AWG cable. Preferably the cable available from Furukawa Cable, of Japan, Catalog No. FURUKAWA UL 2789 (25 pairs, 30 AWG) OA-EV(D)-SB. Desirably, the indicated cable has a very small diameter and is easy to handle and use. The preferred cable has external appearances which are generally the same as the cable used for standard RS-232 communications between computing devices. The braided shield should be frame grounded on both ends. It is also preferred that the 50-pin connectors utilized on the host port, on the remote port, and on the communication cable be those available from Fujitsu Connector of Japan, Catalog Nos. FCN-231J050-G/E (50-pin solder-tail) and FCN-230C050-A/E (shell).

Utilizing the cable thus mentioned, it is possible to maintain data transfer rates across the communication cable of at least four megabytes per second with cable lengths up to 200 feet. Importantly, utilizing the communication cable and hardware structures described herein, cable length should be limited to about 200 feet in order to assure error-free data transmission. However, utilizing the invention disclosed herein, as appropriate components and cables become available, faster data transfer rates may be utilized. The described interconnecting cable represents just one means for interconnecting the remote port to the host port. Any structures capable of conveying the data bits in a parallel configuration between the two ports is thus intended to fall within the scope of the present invention.

Provided below in Table D is a listing of the preferred communication cable pinout definitions when using the cable and connectors just identified.

TABLE D

| Twisted Pair | Color Code | Pins | Function |
|---|---|---|---|
| 1 | Blue | 1-1 | AD0 |
|   | White | 2-2 |  |
| 2 | Yellow | 3-3 | AD1 |
|   | White | 4-4 |  |
| 3 | Green | 5-5 | AD2 |
|   | White | 6-6 |  |
| 4 | Red | 7-7 | AD3 |
|   | White | 8-8 |  |
| 5 | Violet | 9-9 | AD4 |
|   | White | 10-10 |  |
| 6 | Blue | 11-11 | AD5 |
|   | Brown | 12-12 |  |
| 7 | Yellow | 13-13 | AD6 |
|   | Brown | 14-14 |  |
| 8 | Green | 15-15 | AD7 |
|   | Brown | 16-16 |  |
| 9 | Red | 17-17 | DPB0 |
|   | Brown | 18-18 |  |
| 10 | Violet | 19-19 | AS |
|   | Brown | 20-20 |  |
| 11 | Blue | 21-21 | UDS |
|   | Black | 22-22 |  |
| 12 | Yellow | 23-23 | LDS |
|   | Black | 24-24 |  |
| 13 | Green | 25-25 | ONLINE |
|   | Black | 50-50 |  |
| 14 | Red | 26-26 | AD8 |
|   | Black | 27-27 |  |
| 15 | Violet | 28-28 | AD9 |
|   | Black | 29-29 |  |
| 16 | Blue | 30-30 | AD10 |
|   | Grey | 31-31 |  |
| 17 | Yellow | 32-32 | AD11 |
|   | Grey | 33-33 |  |
| 18 | Green | 34-34 | AD12 |
|   | Grey | 35-35 |  |
| 19 | Red | 36-36 | AD13 |
|   | Grey | 37-37 |  |
| 20 | Violet | 38-38 | AD14 |
|   | Grey | 39-39 |  |
| 21 | Blue | 40-40 | AD15 |
|   | Orange | 41-41 |  |
| 22 | Yellow | 42-42 | DPB1 |
|   | Orange | 43-43 |  |
| 23 | Green | 44-44 | RW |
|   | Orange | 45-45 |  |
| 24 | Red | 46-46 | ACK |
|   | Orange | 47-47 |  |
| 25 | Violet | 48-48 | HOSTINT |
|   | Orange | 49-49 |  |

AD = Address/Data
DPB = Data Parity Bit
AS = Address Strobe
UDS = Upper Data Strobe
LDS = Lower Data Strobe
R/W = Read/Write
ACK = Acknowledge
HOSTINT = Host Interrupt

The Remote Interface

Figure 8:
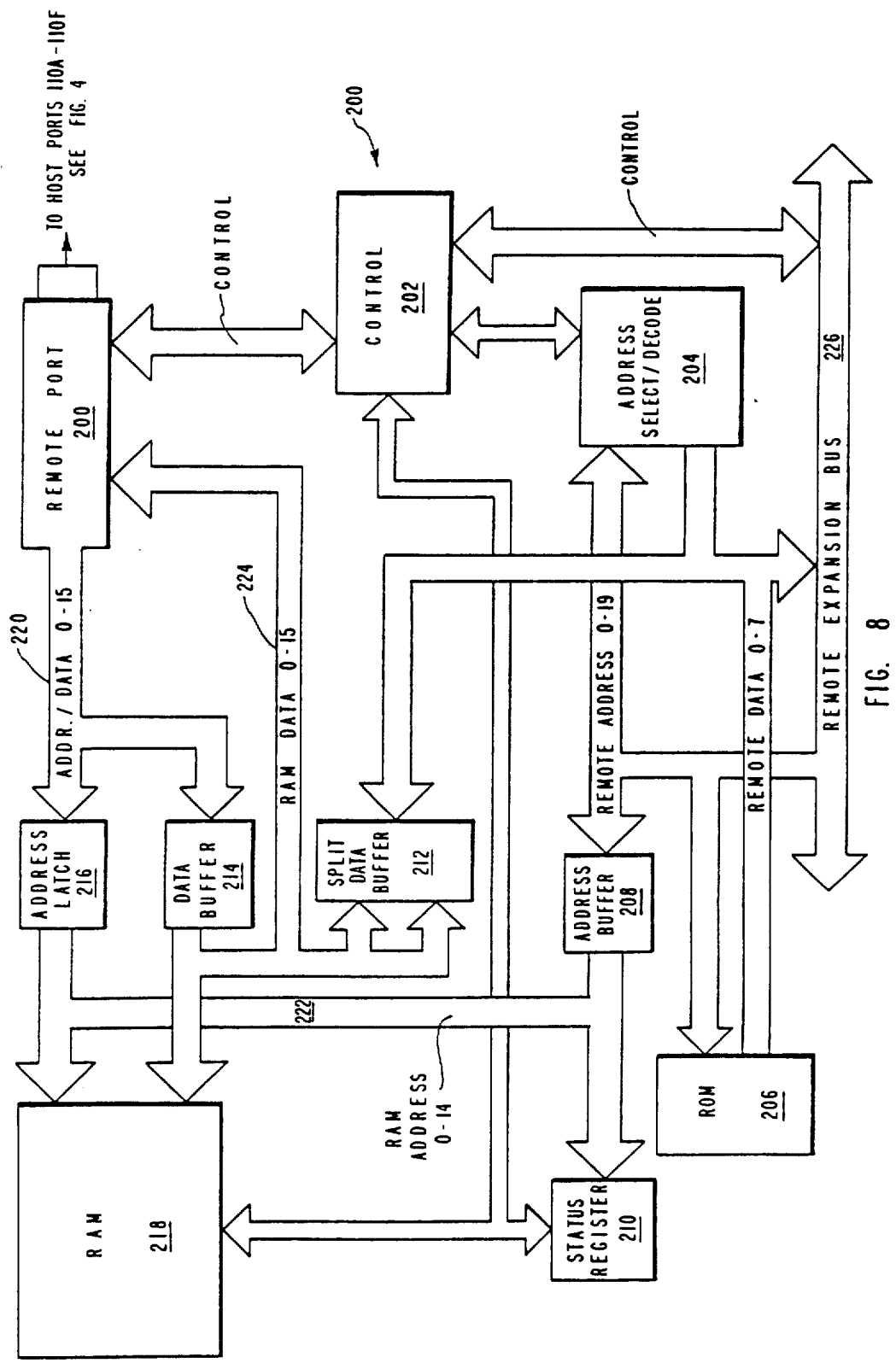
FIG. 8 is a block diagram representing the structure of the remote interface of the system of the present invention shown in FIG. 1.

Provided in FIG. 8 is a block diagram representing the major structures of remote interface 20 of the present invention, the presently preferred embodiment of which is intended to be used with remote computers which are the equivalent of an IBM PC/XT or PC/AT model computer.

Preferably, remote interface 20 is fabricated on a single circuit board which fits into an available slot on a remote expansion bus 226 of the compatible remote computers. In use, the remote interface is transparent to the processor of the remote computer and is accessed as any other device attached to expansion bus 226. Preferably, remote interface 20 is fabricated on a circuit board having two connectors to remote expansion bus 226, so that remote interface 20 can make use of all the additional power, ground, and interrupt lines available on the second connector.

The signals, which are acquired from remote expansion bus 226 are represented in FIG. 8 as including Address 0-19, Data 0-7, AEN, MEMRD, MEMW, SYSCLK, RSTDR, +5 volts, and ground. The signals which remote interface 20 must provide to the remote expansion bus 226 include DATA 0-7, IOCHRDY, OWS, IRQ3, IRQ4, IRQ5, IRQ7, IRQ10, IRQ11, IRQ12, and IRQ15. Those familiar with the structure and operation of the remote computers used with the described embodiment will appreciate the function of each of the named signals More information concerning the preferred remote computers can be found in the publication entitled *IBM Technical Reference Personal Computer AT*, IBM Part No. 6139362 (1st ed. Sep 1985) which is available from International Business Machine Corporation and which is incorporated herein by reference.

As can be seen in FIG. 8, a control circuit 202 of remote interface 20 controls many of the structures of remote interface 20. Control circuit 202 and the other components of remote interface 20 provide a means for transferring data between remote port 200 and RAM 218 and also provide a means for transferring data between RAM 218 and remote expansion bus 226, also referred to earlier as the remote bus. Accordingly, Ram 218 provides a memory means for receiving all digital data presented to the remote port 200 destined for the host computer and for receiving all data presented on the host bus 100 (FIG. 4) destined for a remote computer. Many structures other than those described herein may carry out these functions, and thus such other structures are included within the scope of the present invention.

FIGS. 9-1, 9-2, and 9-3 provide a detailed schematic diagram of the components comprising control circuit 202 in FIG. 8. The component designations and pin outs which are commonly used in the art have been retained in the three parts of FIG. 9.

Figures 1, 9:
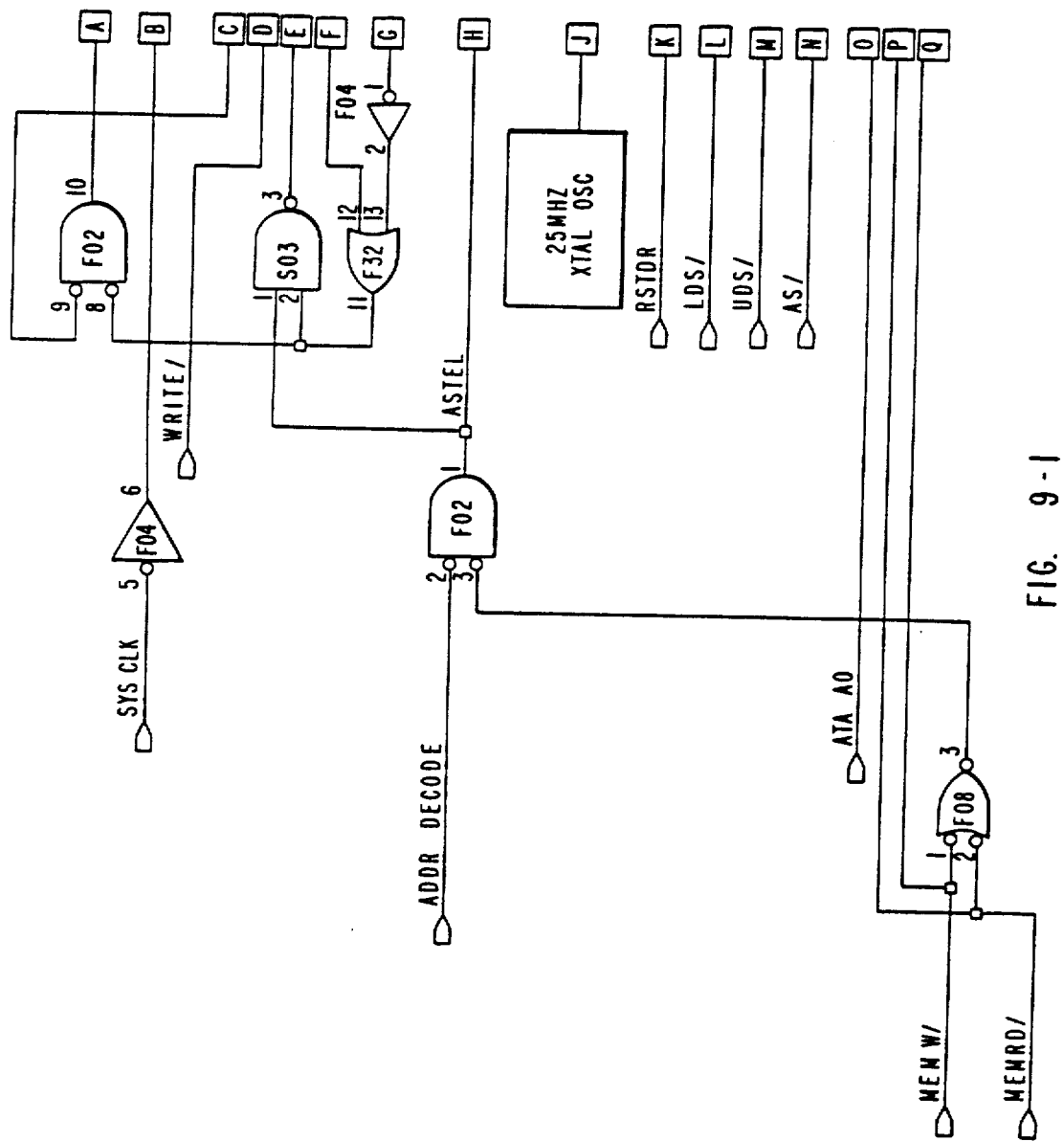
Figures 2, 9:
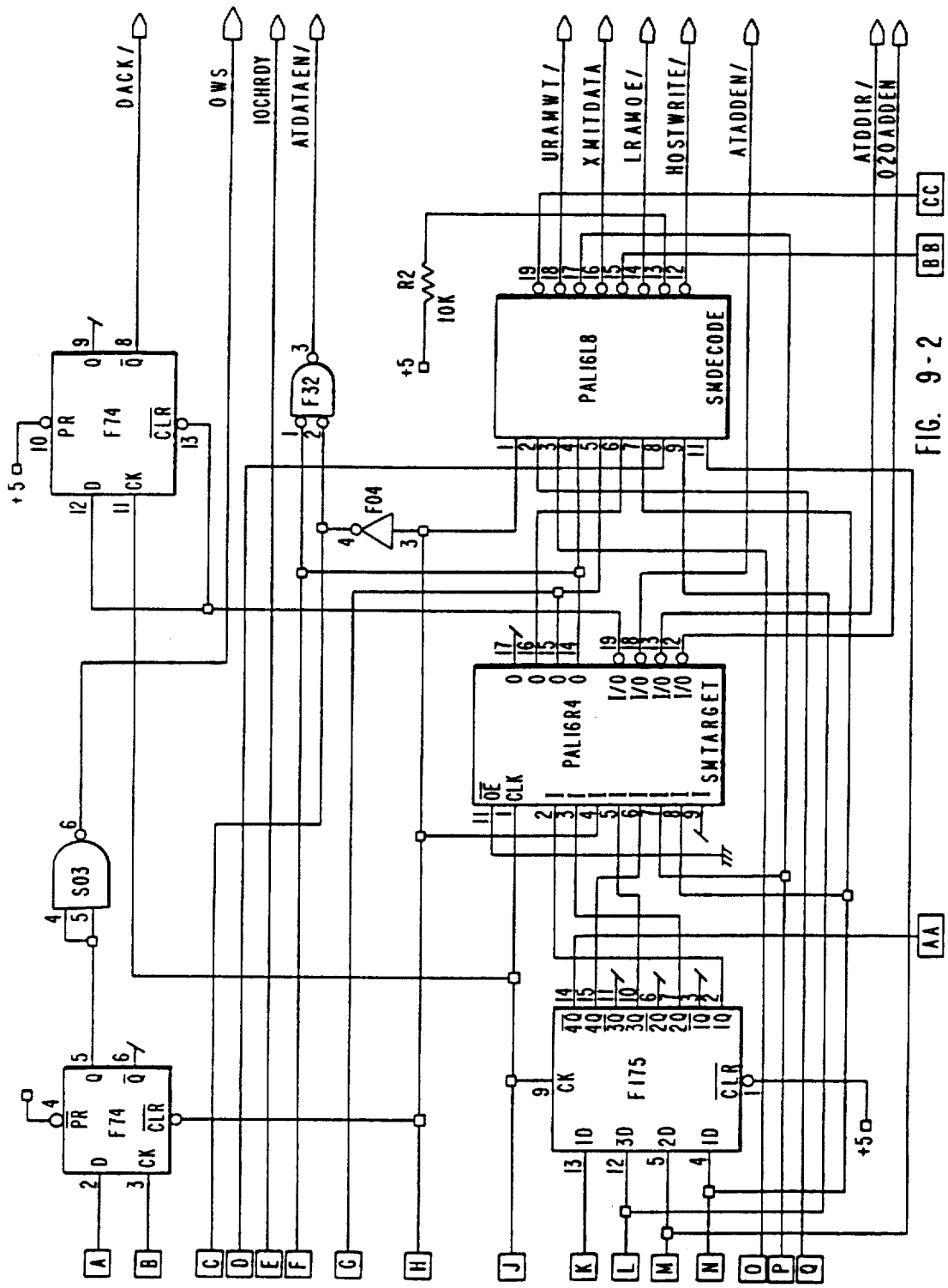
Figures 3, 9:
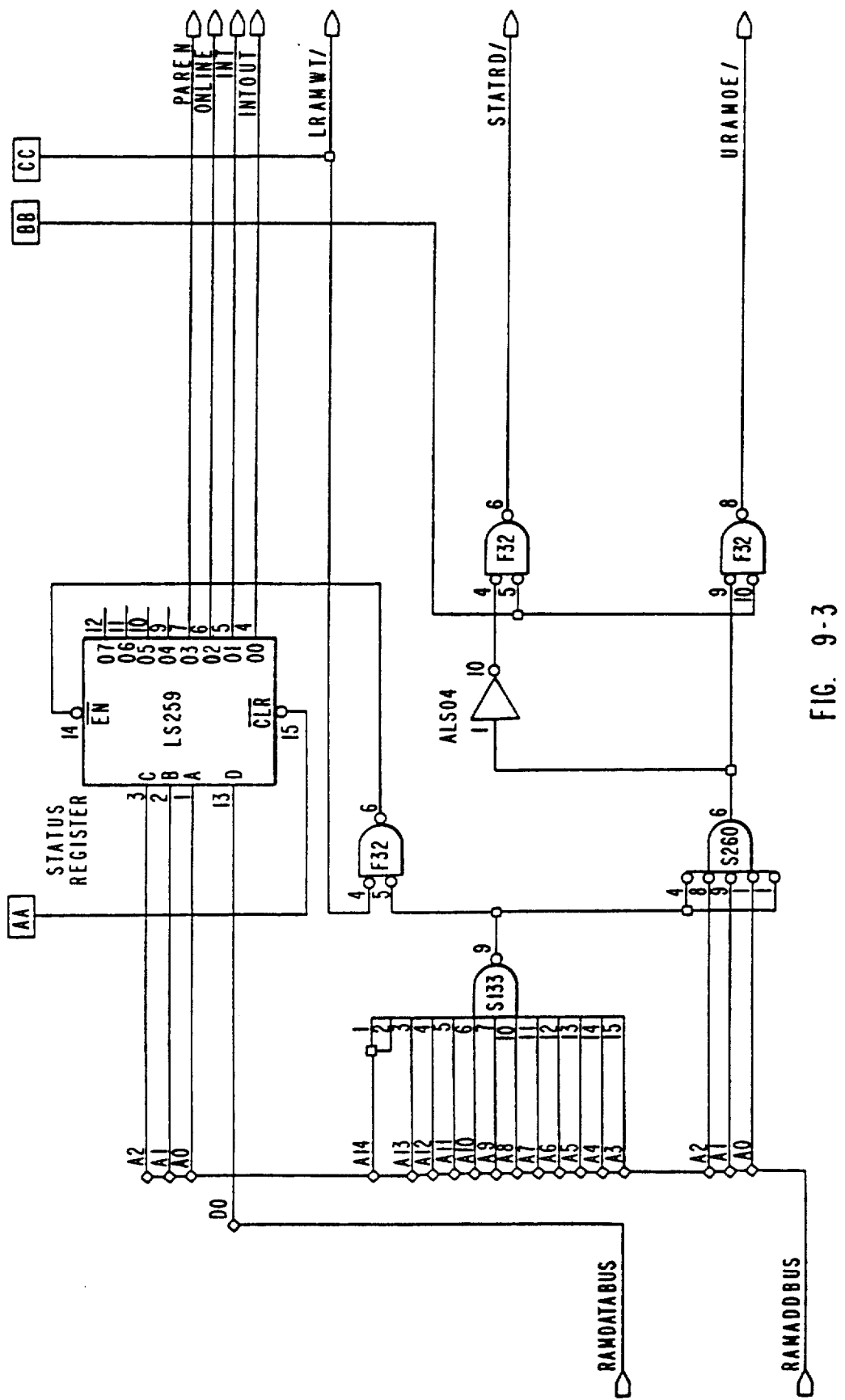
Figure 11:
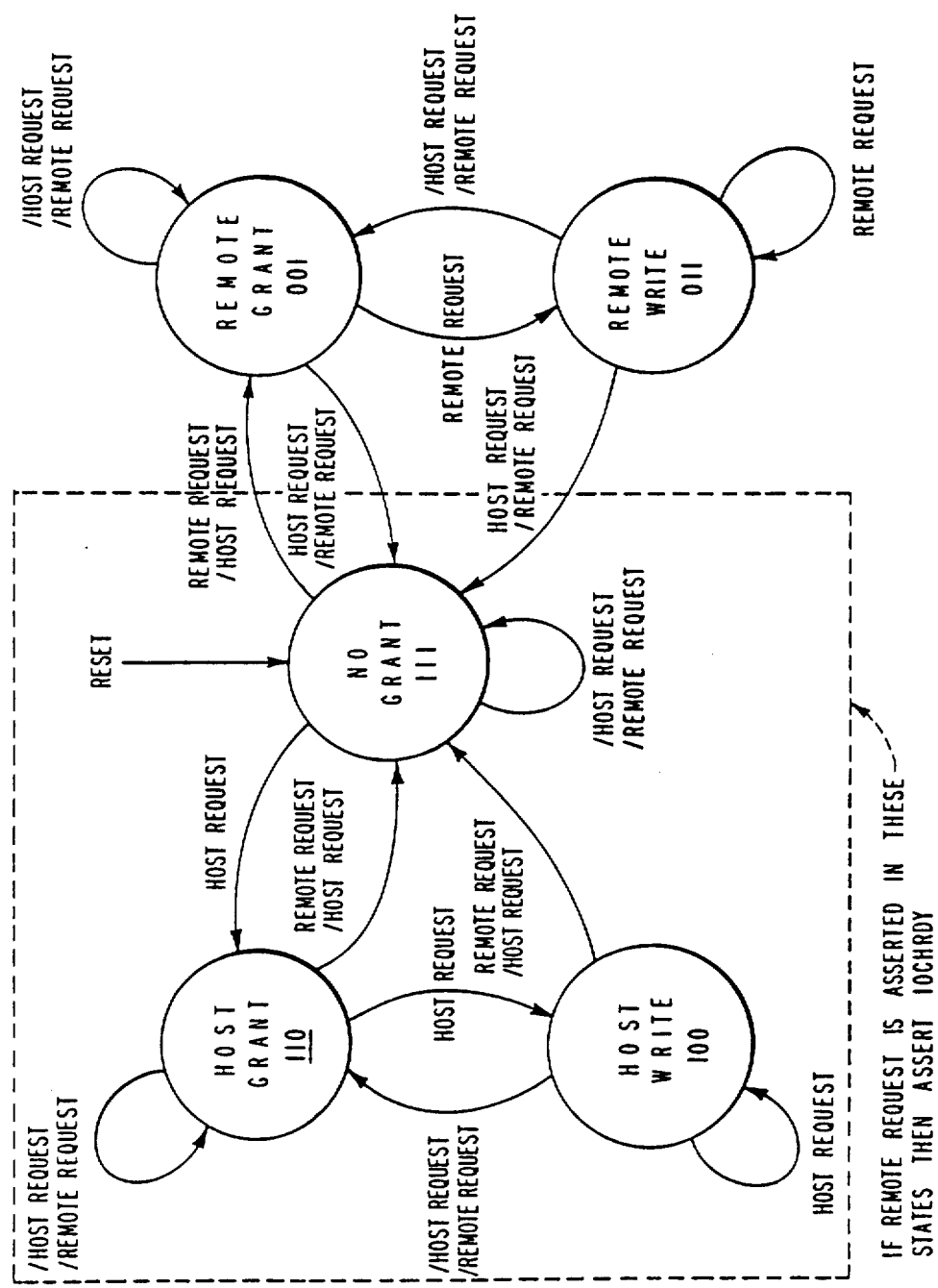
FIG. 11 is a state machine diagram for the state machines implemented in the components shown in FIGS. 9-1, 9-2, and 9-3.

As can be seen in the three parts of FIG. 9, the control circuit includes a 25 MHz crystal oscillator, two F02 NOR logic gates, three F04 inverters, one ALS04 inverter, two AS03 open collector NAND logic gates, five F32 OR logic gates, one F08 AND logic gate, one S133 thirteen-input NAND logic gate, one S260 five-input NOR logic gate, two F74 flip-flops, one F75 Quad D flip-flop, one 10Kohm resistor, one LS259 bit-addressable latch, one PAL 16R4 device, and one PAL 16L8 device. The PAL devices comprise a state machine which controls the read and write access to RAM 218, as well as arbitrates requests for access to RAM 218 by both the host computer and the remote computer. Provided in FIG. 11 is a state machine diagram for the state machine implemented by the PAL devices shown in FIGS. 9-1, 9-2, and 9-3.

Provided in Appendix B and C is the PALASM programming code listings for the PAL devices represented in FIG. 9. Below in Glossary E is a summary of the signals represented in FIG. 9.

| Signal | GLOSSARY E<br>Function |
|---|---|
| | INPUTS |
| SYSCLK | System Clock - Some signals must be synchronized with the system clock in order to be valid. OWS is enabled when the SYSCLK is low. This enables each access to require two less wait states. |
| WRITE | Write - Indicates the start of a write cycle from the host. |
| ADDRDECODE | Address Decode - This signal indicates that a valid address has been decoded after having been compared to the address set by a RAM address switch. |
| ATSEL | AT Select - Indicates an address decode and beginning of a cycle from the remote computer. Asserts a request to the arbitration circuit for the remote computer to access the RAM. |
| RSTDR | Reset Driver - This signal is from the remote computer to indicate a reset. |
| LDS | Lower Data Strobe - This signal is sent from the host. |
| UDS | Upper Data Strobe - This signal is sent from the host. |
| AS | Address Strobe - This signal is from the host and is also asserted to the arbitration circuit to request a host access to the RAM. |
| ATA0 | AT Address 0 - From remote computer address bit 0. |
| MEMRD | Memory Read - A control signal from the remote computer initiating a read cycle. |
| MEMW | Memory Write - A control signal from the remote computer initiating a write cycle. |
| RAMDATABUS-D0 | RAM Data Bus Bit 0 - This bit is the only significant bit when writing to the status register. This bit is from the RAM data bus because both sides are able to access the status register. |
| RAMADDBUS | RAM Address Bus A0-A14 - These |

| Signal | GLOSSARY E<br>Function |
|---|---|
| | address bits are used to decode the address of the status register which is FFF0 as well as a bit addressable latch. |
| | OUTPUTS |
| DACK | Data Acknowledge - returned to the host computer as ACK. |
| OWS | Zero Wait States - This signal is asserted as soon as it is known that the remote computer will have access to the memory and tells the microprocessor to eliminate the wait states that it normally inserts when accessing memory on the expansion bus. |
| IOCHRDY | I/O Channel Ready - asserted until the remote control circuit grants to the remote computer. |
| ATDATAEN | AT Data Enable - enables the data buffer from the remote data bus to the RAM data bus. |
| URAMWT | Upper RAM Write. |
| XMITDATA | Transmit Data - Transmit data to the host from the RAM, i.e., enables differential drivers. |
| LRAMOE | Lower RAM Output Enable. |
| HOSTWRITE | Host Write - This signal enables the host access to the RAM, by way of the RAM data bus and allows the address from the host to be maintained after AS has been released. |
| ATADDEN | AT Address Enable - This signal enables the address buffer from the remote computer onto the RAM address bus. |
| ATDDIR | AT Data Direction. |
| 020ADDEN | Host Address Enable - This signal enables the address latch to buffer the address from the host to the RAM address bus. |
| PAREN | Parity Enable - This one bit signal enables the flip-flops with the parity error information to output. |
| ONLINE | On Line - This signal is asserted when the ROM has initialized the remote computer memory and is transmitted to the host computer as the ONLN signal. This signal also enables the differential receivers of the control lines. |
| INT | Interrupt to the remote computer. |
| INTOUT | Interrupt to the host computer. |
| LRAMWT | Lower RAM Write. |
| STATRD | Status Read - This signal is asserted when the status address is decoded and the status is being read. |
| URAMOE | Upper RAM Output Enable. |

Referring again to the high level block diagram of FIG. 8, an address select/decode circuit 204 is associated with control circuit 202. The processor of the remote computer addresses the remote interface 20 as a logical device connected to remote expansion bus 226. Thus, the address space for RAM 218 of remote interface 20 must be flexible enough to fit in any address space available in the remote computer. Preferably, address select/decod circuit 204 is provided with a switch (not shown) which allows any address space to be selected.

Address select/decoder circuit 204 should be able to select an address for the remote interface at any 64K boundary within the 1 megabyte of address space available on the remote computers. Careful attention must be paid to selecting appropriate memory space, since system memory, as well as other adapter cards, must reside in the same memory space. Thus, the available memory space is often crowded.

Also in FIG. 8 is a status register 210, which is used by the remote interface 20 to determine the status of the host interface and to arbitrate what functions may be carried out.

The least significant byte of the four words beginning at an offset of FFF0 will return the contents of RAM 218 at those locations. The D0 bits of these words are loaded into status register 210. These bits may be written by either the host computer or the remote computer. The first bits (D0) are actually latches that are set in status register 210, but are also shadowed in RAM 218, so they may be easily read.

The contents of these locations are not guaranteed, if the online status bit shown below is 0. The online status bit can be sampled with the bits below by reading a word at the appropriate location.

In Table E below is a list of the addresses of the status bits found in RAM 218 and their definition.

TABLE E

| Offset | Bit | Function |
| --- | --- | --- |
| FFF0 | D0 | Attention to Interrupt. |
| FFF2 | D0 | Attention to Remote Interrupt. |
| FFF4 | D0 | Online. |
| FFF6 | D0 | Remote Parity Enable |

In the presently preferred embodiment, the definitions of the remaining words of the 8-word space are reserved for future use. Also, in the upper byte of address offset FFF0 the parity error status bits are gated onto the data bus. These parity error status bits can only be read by the remote processor.

In Table F below is a list of the four parity error data bits.

TABLE F

| Offset | Bits | Function |
| --- | --- | --- |
| FFF0 | D15 | Lower Address Parity Error |
| FFF0 | D14 | Lower Data Parity Error |
| FFF0 | D13 | Upper Address Parity Error |
| FFF0 | D12 | Upper Data Parity Error |

In FIG. 8 is a ROM 206 which is directly accessible from remote expansion bus 226. During the initialization process of the remote computer, ROM 206 is located and the code contained therein causes the remote computer to provide space for the remote interface initialized RAM 218. The location of RAM 218 is conveyed to the remote processor by placing the address of the desired RAM 218 from a switch provided in address select/decode 204 onto remote expansion bus 226.

Remote interface 20 further comprises one remote port 200. Data which is received at the remote port 200 is first directed to an address latch 216 and to a data buffer 214 in remote interface 20. When an address is presented at the remote port 200, it is latched into the address latch 216 by the assertion of the AS (address strobe) control signal. At this point, the Host Write control signal continues to be asserted onto the latch input in order to provide noise immunity at the end of the clock cycle.

Since access by either the host computer or the remote computer to RAM 218 must first be synchronized with the clock (FIG. 9) in remote interface 20, the address must be latched before address/data bus 220 is switched from carrying the address to carrying data bits. When control circuit 202 allows the host computer to access RAM 218, the address latch 216 releases the address onto a RAM address bus 222 upon the assertion of the MC 68020 address enable 020ADDEN signal. Once the data is stable on address/data bus 220, the data buffer 214 passes the data present at the remote port onto the RAM data bus upon the assertion of the HOSTWRITE (host write) control signal.

Also represented in FIG. 8 is a split data buffer 212. In split data buffer 212 the 8-bit remote expansion bus of the remote computer is converted to the 16-bit RAM data bus connected to the RAM 218. Depending upon the state of the remote computer address, either the upper or lower portion of split data buffer 212 is enabled with the ATDATAEN control signal. Split data buffer 212 passes the data received from remote expansion bus 226 to either the upper or lower byte of RAM data bus 224. Depending upon the state of the ATDDIR (AT Data Direction) control signal, data may be passed from remote expansion bus 226 to RAM 218, or vice versa.

An address buffer 208 in FIG. 8 functions to allow remote expansion bus 226 access to RAM 218 upon assertion of the ATADDEN (AT address enable) control signal.

RAM 218 in FIG. 8 preferably provides 64 Kbytes of memory consisting of eight 8K static RAM semiconductor memory chips. The semiconductor memory chips preferably are organized into four banks, each bank comprises 8K of 16-bit wide words. Alternatively, two 32K by eight-bit status RAM semiconductor memory chips may be installed in one of the banks. RAM address bus 222 and lines A13 and A14 are preferably used to select the proper bank. RAM address bus 222 lines A0-A12 are needed to decode the 8K memory locations.

The LRAMWT (lower RAM write) and LRAMOE (lower RAM output enable) control signals are supplied to the lower bytes of each bank. The remote computer address 0 or UDS and LDS control signals provide the necessary information to control the logic to enable the appropriate bytes in the RAM.

Figure 10:
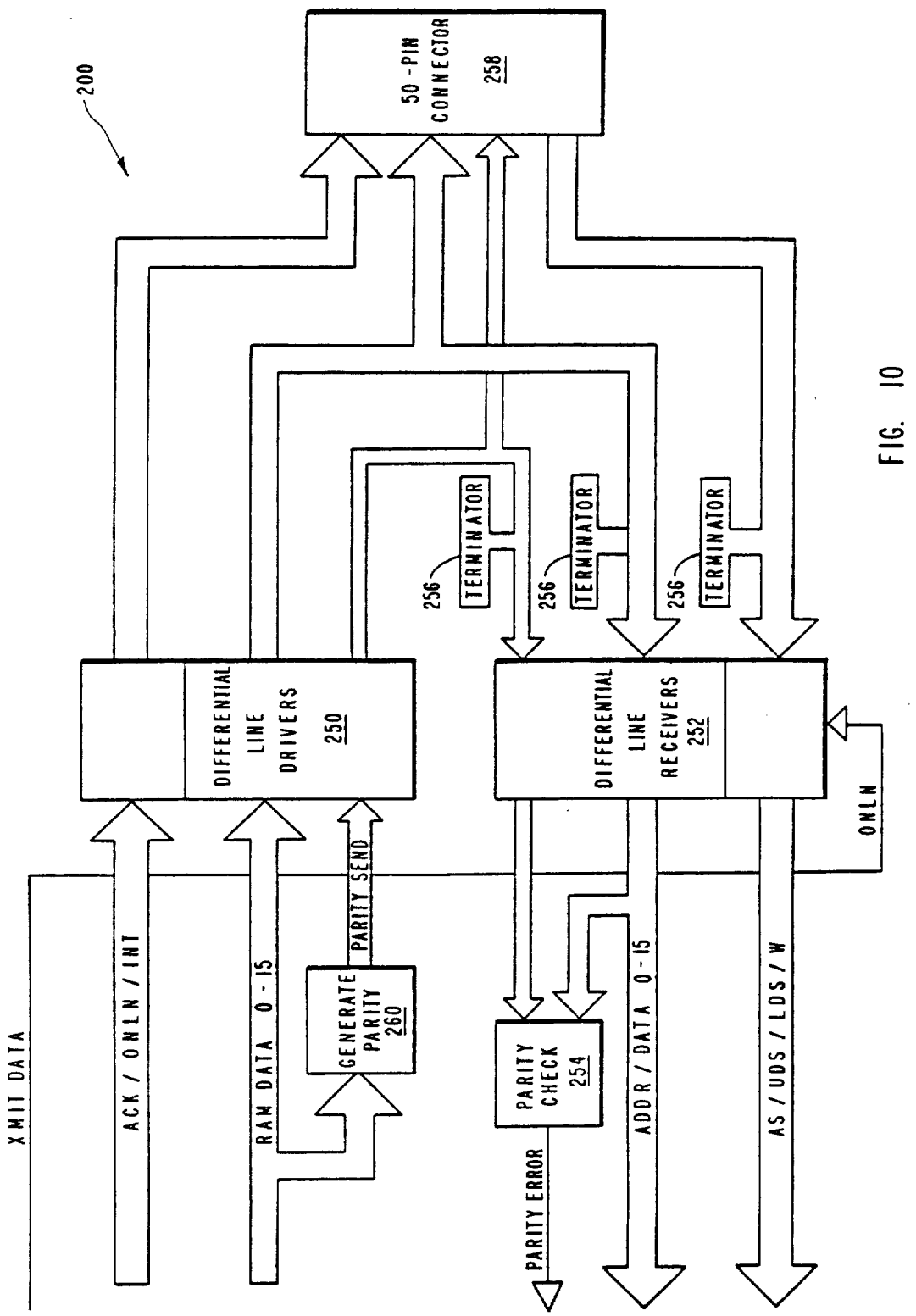
FIG. 10 is a block diagram showing the structure of the remote port of the system of the present invention represented in FIG. 8.

FIG. 10 is a detailed block diagram representing the organization and components of remote port 200 in FIG. 8. As was described in connection with the host ports 110A-110F (FIG. 4), each bit in remote port 200 is driven by one of a plurality of differential line drivers 250 onto a pair of conductors in the communication cable by way of a 50-pin connector 258. Resistive terminators 256 are provided on the receive end of all pairs of conductors in the communication cable according to the previously specified criteria. Remote port 200 is also provided with a plurality of differential line receivers 252, which preferably are identical to the same devices in the host ports. The structures illustrated in FIG. 10 represent a presently preferred mode of implementing the means for providing a remote port. Many other structures carrying out the same functions may be substituted therefore and will be included within the scope of the present invention.

As represented in FIG. 10, the control signals AS, UDS, LDS, and WRITE are enabled through differential line receivers 252 by the ONLN control signal. The address/data lines and parity lines are permanently enabled to allow access to be initiated at any time by the host computer.

A parity check circuit 254 is also provided in remote port 200. The address and data bits are combined and checked for errors with the respective parity bits by the parity check circuit 254 as they are received. Parity is clocked with the AS or UDS and LDS control signals. If an error occurs, it is latched into a flip-flop. Preferably, four latches (not shown) are provided to record an error in the upper or lower byte of the address or the data. The combined output of these latches generates the PARINT control signal. The output of these latches is gated onto RAM data bus 224 (FIG. 8) with the STATRD signal in order to detect in which byte the error occurred.

A parity generate circuit 260 provides two parity bits which are transmitted to the host computer along with the data or address bits. The parity check circuit 118 (FIG. 4) of the host interface checks for parity errors when the bits are received.

The ACK, ONLN, and INT control signals represented in FIG. 10 are permanently enabled through differential line drivers 250 of remote port 200. The bits of RAM data bus 224 and the parity bits are enabled through differential line drivers 250 by the XMIT-DATA (transmit data) signal.

In view of the foregoing, it will be appreciated that the present invention provides a system which allows a remote computer to efficiently share the resources of a host computer. A high speed communication path is established by the present invention between a host computer and any number of remote computers. Thus, a remote computer may use the magnetic disk drive of the host computer and greatly reduce its disk access time as compared to when a relatively small remote computer disk drive is used.

Moreover, with the very fast data transfer rates between the host and remote computers, very fast file transfers may be effected, even from one operating system to another. Further functions, such as print spooling, allow the remote computer to offload printing tasks to the host computer while the remote computer carries on other tasks. The present invention also greatly improves the performance of remote computers being used as terminals of the host computer. Still further, the present invention may be used with a local area network to both speed up the operation of the local area network and to allow all of the remote computers on the network to have access to the services of the host computer.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

APPENDIX A to

UNITED STATES PATENT APPLICATION for

SYSTEM AND METHOD FOR SHARING RESOURCES OF A HOST
COMPUTER AMONG A PLURALITY OF REMOTE COMPUTERS (Host Interface Control Circuit PAL)

```
PAL16L8
SMHOST  814-048-001
DECODE PAL FOR VARIOUS SIGNALS ON THE SMILE HOST BOARD

BOARDSEL /WRITEL /SACK ACKEN SELONLN /INTDS GLBLA0 SIZ0 SIZ1 GND
LA16 NC SREGDATA /SGBDEN /GBDEN /ENLDS /ENUDS /DSACKEN /PARCLK VCC

DSACKEN  =  SACK * ACKEN * BOARDSEL
         +  ACKEN * /SELONLN * BOARDSEL
         +  DSACKEN * BOARDSEL

ENUDS    =  INTDS * /GLBLA0 * /LA16
         +  INTDS * GLBLA0 * LA16
         +  INTDS * /SIZ0 * LA16
         +  INTDS * SIZ1 * LA16

ENLDS    =  INTDS * GLBLA0 * /LA16
         +  INTDS * /SIZ0 * /LA16
         +  INTDS * SIZ1 * /LA16
         +  INTDS * /GLBLA0 * LA16

GBDEN    =  BOARDSEL * WRITEL * /LA16
         +  DSACKEN * /LA16

SGBDEN   =  BOARDSEL * WRITEL * LA16
         +  DSACKEN * LA16

/SREGDATA = /SELONLN
          + /SACK

PARCLK   =  DSACKEN * /WRITEL * INTDS
```

APPENDIX B to

UNITED STATES PATENT APPLICATION for

SYSTEM AND METHOD FOR SHARING RESOURCES OF A HOST
COMPUTER AMONG A PLURALITY OF REMOTE COMPUTERS (Remote Interface Control Circuit SMTARGET PAL)

```
PAL16R4
SMTARGET  814-049-001
THIS IS THE STATE MACHINE PAL FOR THE XT/AT SMILE TARGET BOARD

CLK /020REQ /020UDS ATSEL /020LDS RESET /MEMRD /AS NC1 GND
OE /020ADDEN /ATDDIR /SMACHA /SMACHB /SMACHC /ATREQ /ATADDEN /DACK VCC

SMACHA  := /RESET * /020REQ * SMACHA * /SMACHC
        +  /RESET * ATREQ * SMACHA * /SMACHC
        +  /RESET * /020REQ * ATREQ * /SMACHB * /SMACHC

SMACHB  := /RESET * /020REQ * /ATREQ * SMACHA * /SMACHC
        +  /RESET * 020REQ * 020UDS * /SMACHA * SMACHC
        +  /RESET * 020REQ * 020LDS * /SMACHA * SMACHC
        +  /RESET * 020REQ * /SMACHA * SMACHB * SMACHC
        +  /RESET * /020REQ * ATREQ * /SMACHA * /SMACHB * /SMACHC

SMACHC  := /RESET * 020REQ * /SMACHA * /SMACHB
        +  /RESET * 020REQ * /SMACHA * SMACHC
        +  /RESET * /ATREQ * /SMACHA * SMACHC

ATREQ   := ATSEL

DACK    = /AS
        + SMACHA
        + /SMACHB
        + /SMACHC
        + /020UDS * /020LDS

ATDDIR  = /ATSEL
        +  ATSEL * /MEMRD

ATADDEN = SMACHA * ATSEL

020ADDEN = /SMACHA * AS
```

APPENDIX C to

UNITED STATES PATENT APPLICATION for

SYSTEM AND METHOD FOR SHARING RESOURCES OF A HOST

COMPUTER AMONG A PLURALITY OF REMOTE COMPUTERS (Remote Interface Control Circuit SMDECODE PAL)

```
6L8
CODE  814-051-001
 IS THE DECODE PAL FOR THE XT/AT SMILE TARGET BOARD

L /MEMW ATA0 /SMACHA /SMACHB /SMACHC /AS /WRITE /LDS GND
 /HOSTWRITE SBHE /LRAMOE /URAMOE XMITDATA /MEMRD /URAMWT /LRAMWT VCC

WRITE = SMACHC * UDS * WRITE
      + SMACHC * LDS * WRITE

TDATA = WRITE
      + /LDS * /UDS
      + /SMACHC

[WT  = ATSEL * MEMW * /ATA0 * SMACHA * /SMACHB * /SMACHC
     + AS * WRITE * LDS * /SMACHA * SMACHB * SMACHC

[WT  = ATSEL * MEMW * /SBHE * SMACHA * /SMACHB * /SMACHC
     + ATSEL * MEMW * ATA0 * SMACHA * /SMACHB * /SMACHC
     + AS * WRITE * UDS * /SMACHA * SMACHB * SMACHC

IOE  = ATSEL * MEMRD * /ATA0 * SMACHA
     + AS * /WRITE * LDS * SMACHC
     + AS * /WRITE * UDS * SMACHC

IOE  = ATSEL * MEMRD * /SBHE * SMACHA
     + ATSEL * MEMRD * ATA0 * SMACHA
     + AS * /WRITE * UDS * SMACHC
     + AS * /WRITE * LDS * SMACHC .
``` at is claimed and desired to be secured by United
Letters Patent is:
A high speed digital communication system for
g a first digital processor connected to a first bus
second digital processor connected to a second
he system comprising:
t port means for presenting digital data in a paral-
el configuration;
first control means for conveying digital data be-
tween the first bus and the first port means;
second port means for presenting digital data in a
parallel configuration;
memory means for receiving all digital data presented
to the second port means destined for the first digi-
tal processor and for receiving all data presented on the first bus destined for the second digital processor;

second control means for directing flow of designated data among the second port means, the memory means, and the second bus; and interconnecting means for establishing a parallel digital communication path between the first port means and the second port means for rapidly transferring digital data between the first bus and the second bus to permit high speed communication between the first and second digital processors.

2. A high speed digital communication system as defined in claim 1 wherein the first port means comprises:

a plurality of differential line drivers; and
a plurality of differential line receivers.

3. A high speed digital communication system as defined in claim 2 wherein the plurality of differential line drivers and differential line receivers are connected in parallel.

4. A high speed digital communication system as defined in claim 1 wherein the first port means comprises a number of differential line drivers and wherein the interconnecting means comprises a number of paired conductors, the number of differential line drivers and the number of paired conductors being at least as great as whatever maximum number of bits of digital data is to be transferred between the first digital processor and the second digital processor in a parallel configuration.

5. A high speed digital communication system as defined in claim 4 wherein the first port means comprises a plurality differential line receivers and a terminating resistance connected across each pair of conductors in the interconnecting means connected to each differential line receiver.

6. A high speed digital communication system as defined in claim 1 wherein the first port means, the second port means, and the interconnecting means each comprises a plurality of control signal paths and a parallel data transmission path of at least 16-bits in width.

7. A high speed digital communication system as defined in claim 1 wherein the interconnecting means comprises a cable having at least 16 twisted pairs of conductors.

8. A high speed digital communication system as defined in claim 7 wherein the first port means and the second port means each comprise a connector having at least 32 conductors.

9. A high speed digital communication system as defined in claim 1 wherein the first bus includes an upper and a lower byte and wherein the system further comprises means for selectively swapping the upper and lower bytes of digital data being directed to and received from the first bus.

10. A high speed digital communication system as defined in claim 9 wherein the means for swapping the upper and lower bytes comprises:

a first set of buffers having their inputs and outputs connected such that the upper and lower bytes of digital data are passed straight through the first set of buffers;

a second set of buffers having their inputs and outputs connected such that the upper and lower bytes of digital data are swapped while passing through the buffers; and a control line connected to the first control means, the control line determining whether the first set or second set of buffers is active.

11. A high speed digital communication system as defined in claim 1 comprising a plurality of first port means.

12. A high speed digital communication system as defined in claim 11 further comprising means for selecting one of the plurality of first port means from an address presented on the first bus.

13. A high speed digital communication system as defined in claim 1 wherein the first bus sequentially contains an address followed by digital data destined for the address and wherein the system further comprises means for sequentially multiplexing to the first port means the address and the digital data presented on the first bus.

14. A high speed digital communication system as defined in claim 1 wherein the system further comprises means for checking for digital data transmission errors.

15. A high speed digital communication system as defined in claim 14 wherein the means for checking for digital data transmission errors comprises a parity generator circuit and a parity check circuit.

16. A high speed digital communication system as defined in claim 1 wherein the memory means comprises a dual-ported random access memory.

17. A high speed digital communication system as defined in claim 1 wherein the memory means comprises:

a random access memory;

a first buffer connected between the random access memory and the second bus in order to allow the transfer of digital data between the random access memory and the second bus; and a second buffer connected between the random access memory and the second port means in order to allow the transfer of digital data between the random access memory and the second port means.

18. An interprocessor communication system for establishing a communication path between at least one remote processor connected to a remote bus in a remote computer and a host processor connected to a host bus in a host computer, the communication system comprising:

means for providing at least one host data port at the host computer, the host data port comprising a plurality of data transfer lines arranged in a parallel configuration;

means for establishing a digital communication path between the host bus and the means for providing at least one host data port;

means for providing a remote data port at the remote processor, the remote data port comprising a plurality of data transfer lines arranged in a parallel configuration;

means for storing digital data received from and destined for the means for providing a remote data port;

first means for transferring data between the remote bus and the means for storing;

second means for transferring data between the means for storing and the means for providing a remote data port; and means for interconnecting the means for providing a host data port and the means for providing a remote data port to create a parallel data path therebetween and to provide for bidirectional data flow between the host bus and the remote bus for high speed exchange of digital data between the host processor and the remote processor.

19. An interprocessor communication system as defined in claim 18 wherein the means for providing a remote data port comprises:
  a plurality of differential line drivers; and
  a plurality of differential line receivers.

20. An interprocessor communication system as defined in claim 19 wherein the plurality of differential line drivers and the plurality of differential line receivers are connected in parallel.

21. An interprocessor communication system as defined in claim 18 wherein the means for providing a remote data port comprises a number of differential line drivers and wherein the means for interconnecting comprises a number of paired conductors, the number of differential line drivers and the number of paired conductors being at least as great as the number of bits of digital data to be transferred between the remote processor and the host processor in a parallel configuration.

22. An interprocessor communication system as defined in claim 21 wherein the means for providing at least one host port comprises a plurality of differential line receivers and a terminating resistance connected across each pair of conductors in the interconnecting means connected to each differential line receiver.

23. An interprocessor communication system as defined in claim 18 wherein the means for providing at least one host data port, the means for providing a remote data port, and the means for interconnecting each comprises a plurality of control signal paths and a parallel data transmission path of at least 16-bits in width.

24. An interprocessor communication system as defined in claim 18 wherein the means for interconnecting comprises a cable having at least 16 twisted pairs of conductors and an outer diameter of less than one-half inch.

25. An interprocessor communication system as defined in claim 24 wherein the means for providing at least one host port and the means for providing a remote port each comprise a connector having at least 32 conductors.

26. An interprocessor communication system as defined in claim 18 wherein the host bus includes an upper and a lower byte and wherein the system further comprises means for selectively swapping the upper and lower bytes of digital data being directed to and received from the host bus.

27. An interprocessor communication system as defined in claim 26 wherein the means for swapping the upper and lower bytes comprises:
  a first set of buffers having their inputs and outputs connected such that the upper and lower bytes of digital data are passed straight through the first set of buffers;
  a second set of buffers having their inputs and outputs connected such that the upper and lower bytes of digital data are swapped while passing through the buffers; and
  a control line connected to the means for establishing a digital communication path, the control line determining whether the first set or second set of buffers is active.

28. An interprocessor communication system as defined in claim 18 further comprising a plurality of host data ports and means for selecting one of the plurality of host data ports from the address presented on the host bus.

29. An interprocessor communication system as defined in claim 18 wherein the host bus sequentially contains an address followed by digital data destined for the address and wherein the system further comprises means for sequentially multiplexing the address and the digital data presented on the host bus to the means for providing at least one host data port.

30. An interprocessor communication system as defined in claim 18 wherein the system further comprises means for checking for digital data transmission errors.

31. An interprocessor communication system as defined in claim 30 wherein the means for checking for data transmission errors comprises a parity generator circuit and a parity check circuit.

32. An interprocessor communication system as defined in claim 18 wherein the means for storing digital data comprises:
  a random access memory;
  a first buffer connected between the random access memory and the remote bus in order to allow the transfer of digital data between the random access memory and the remote bus; and
  a second buffer connected between the random access memory and the remote data port in order to allow the transfer of digital data between the random access memory and the remote data port.

33. A system for allowing resources of a host computer to be shared with a remote computer, the system comprising:
  remote port means at the remote computer for receiving and transmitting digital data in a parallel configuration;
  memory means at the remote computer for temporarily storing digital data received from and destined to the remote port means;
  remote computer control means for (a) controlling the passage of digital data between the memory means and the remote port means, and for (b) controlling passage of digital data between the memory means and an internal bus of the remote computer;
  host port means at the host computer for receiving and transmitting digital data in a parallel configuration;
  control means for controlling passage of digital data between the host port means and an internal bus of the host computer; and
  cable means for interconnecting the remote port means and the host port means for rapidly transferring digital data between said internal bus of the host computer and said internal bus of the remote computer, the cable means bidirectionally transmitting digital data in a parallel configuration.

34. A system for exchanging digital data between internal structures of a larger host computer and a plurality of remote computers, the system comprising:
  (a) a host computer interface comprising:
    (i) a plurality of host ports, each of the host ports configured to transmit and receive digital data in a parallel mode;
    (ii) a host address circuit for directing data contained on the bus of a host computer to said addressed host ports; and
    (iii) a multiplexing circuit for sequentially passing a portion of address and digital data presented on said bus of the host computer to the host port;

(b) a remote computer interface at each remote computer, each remote computer interface comprising:
  (i) a remote port configured to transmit and receive digital data in a parallel mode;
  (ii) a random access memory connected to the remote port for temporary storage of the data directed to and received from the remote port; and
  (iii) control and address circuits for controlling transfer of digital data between a remote bus and the random access memory by allowing data placed on said remote bus of the remote computers to address the random access memory; and
(c) a communication cable connected between said plurality of host ports and the remote port in a parallel configuration for communicating digital data presented at one of said host ports or the remote port and thereafter communicating said digital data to the other port, the communication cable comprising a plurality of pairs of conductors, each pair of conductors conveying one data bit of a byte of digital data presented at the host computer at the remote port.

35. A method for communicating digital data between a host computer and at least one remote computer, the method comprising the steps of:
  conveying the digital data from a bus of the host computer to a host port, the digital data being presented in a parallel configuration at the host port;
  communicating in a parallel configuration to a remote port located at the remote computer the digital data presented at the host port;
  storing the digital data communicated to the remote port;
  interrupting the remote computer to request access to a bus of the remote computer; and
  transferring the stored digital data to the bus of the remote computer, thereby establishing a high speed communication path between the bus of the host computer and the bus of the remote computer.

36. A method as defined in claim 35 wherein the step of conveying data comprises the steps of sequentially conveying an address and conveying digital data to the host port.

37. A method as defined in claim 35 further comprising the step of swapping byte order on the host bus.

38. A method as defined in claim 35 wherein the step of communicating the data comprises the step of communicating each data bit on an individual one of a plurality of conductors.

39. A method as defined in claim 35 wherein the step of communicating the data comprises the step of differentially driving a pair of conductors for each data bit.

40. A method as defined in claim 35 wherein the step of storing the data comprises the step of entering the digital data in a random access memory.

41. A method as defined in claim 40 wherein the step of transferring the data comprises the step of transferring eight-bit bytes of data from the random access memory to said bus of the remote computer.

42. A method as defined in claim 40 further comprising the steps of:
  transferring digital data presented on the bus of the remote computer to the random access memory;
  presenting the digital data in the random access memory to the remote port;
  communicating to the host port in a parallel configuration the digital data presented at the remote port;
  interrupting the host computer to request access to the bus of the host computer; and
  conveying the digital data communicated to the host port to the host bus.

43. A method as defined in claim 42 wherein the host port and the remote port are interconnected by a cable and wherein the method further comprises the step of arbitrating between the host computer and the remote computer access to the random access memory.

* * * * *

UNITED STATES PATENT AND TRADEMARK OFFICE
CERTIFICATE OF CORRECTION

PATENT NO. : 4,994,963

DATED : February 19, 1991

INVENTOR(S) : RANDALL J. RORDEN et al.

It is certified that error appears in the above-identified patent and that said Letters Patent is hereby corrected as shown below:

```
Column 1, line 25, after "tasks" insert --for which--
Column 1, line 35, after "systems" insert --.--
Column 6, line 60, "first-served" should be --first serve--
Column 8, line 44, "principle bus" should be --principal bus--
Column 9, line 54, "singal" should be --signal--
Column 9, line 67, "SELONLIN" should be --SELONLN--
Column 12, line 49, "buy way" should be --by way--
Column 13, line 31, "principle components" should be
--principal components--
Column 16, line 53, after "signals" insert --.--
Column 18, line 58, "decod" should be --decode--
Column 20, line 27, "comprises" should be --comprising--
Column 20, line 56, "therefore" should be --therefor--
```

Signed and Sealed this

Twenty-third Day of March, 1993

Attest:

STEPHEN G. KUNIN

*Attesting Officer*      *Acting Commissioner of Patents and Trademarks*